United States Patent
Shimoshikiryoh

(10) Patent No.: US 12,158,680 B2
(45) Date of Patent: Dec. 3, 2024

(54) DISPLAY DEVICE

(71) Applicant: Sharp Display Technology Corporation, Kameyama (JP)

(72) Inventor: Fumikazu Shimoshikiryoh, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 18/616,246

(22) Filed: Mar. 26, 2024

(65) Prior Publication Data
US 2024/0361653 A1     Oct. 31, 2024

(30) Foreign Application Priority Data
Apr. 28, 2023   (JP) .................................. 2023-074684

(51) Int. Cl.
*G02F 1/133*   (2006.01)
*G02F 1/1343*  (2006.01)
(Continued)

(52) U.S. Cl.
CPC .... *G02F 1/136286* (2013.01); *G02F 1/13306* (2013.01); *G02F 1/13439* (2013.01);
(Continued)

(58) Field of Classification Search
CPC ............... G02F 1/13306; G02F 1/1343; G02F 1/13439; G02F 1/1345; G02F 1/13454;
(Continued)

(56) References Cited

U.S. PATENT DOCUMENTS

2018/0039146 A1*  2/2018  Tanaka .............. G02F 1/136286
2019/0025660 A1   1/2019  Shimoshikiryoh et al.

FOREIGN PATENT DOCUMENTS

| JP | 2022-072294 A | 5/2022 |
| WO | 2017/119338 A1 | 7/2017 |
| WO | 2018/143028 A1 | 8/2018 |

OTHER PUBLICATIONS

Shimoshikiryoh, "Display Device and Driving Method of Display Device", U.S. Appl. No. 18/779,759, filed Jul. 22, 2024.

* cited by examiner

*Primary Examiner* — Thoi V Duong
(74) *Attorney, Agent, or Firm* — Keating & Bennett, LLP

(57) ABSTRACT

A display device includes a substrate including a display region including three or more divided regions disposed in a first direction on a main surface, a scanning line extending in a first direction, a data line extending in a second direction, a plurality of pixels, and a scanning line connection wiring line extending in the second direction, which are disposed in each divided region, a plurality of data line drive circuits respectively connected to the data lines in each divided region, and a plurality of scanning line drive circuits corresponding to each divided region. The scanning line drive circuits and the data line drive circuits are respectively arrayed in the first direction outside the display region, each of the scanning line connection wiring lines electrically connects the scanning line drive circuit to the scanning line, and the scanning line drive circuit and the data line drive circuit display an image in at least one of the three or more divided regions at a frame frequency different from that in the other divided regions.

21 Claims, 21 Drawing Sheets

(51) Int. Cl.
*G02F 1/1345* (2006.01)
*G02F 1/1362* (2006.01)

(52) U.S. Cl.
CPC .... *G02F 1/13454* (2013.01); *G02F 1/136272* (2021.01); *G02F 2201/123* (2013.01); *G02F 2201/52* (2013.01)

(58) Field of Classification Search
CPC ............. G02F 1/1362; G02F 1/136259; G02F 1/136272; G02F 1/136286; G02F 1/1368; G02F 2201/123; G02F 2201/52
See application file for complete search history.

DISPLAY DEVICE

CROSS-REFERENCE TO RELATED APPLICATIONS

This application claims the benefit of priority to Japanese Patent Application Number 2023-074684 filed on Apr. 28, 2023. The entire contents of the above-identified application are hereby incorporated by reference.

BACKGROUND

Technical Field

The disclosure relates to a display device.

Display devices, such as a liquid crystal display device and an organic electroluminescence (EL) display device, are widely used in various fields. For example, in the field of vehicles, information such as a speed or a rotation speed is displayed on a display device instead of a typically used mechanical speedometer or tachometer.

For example, JP 2022-072294 A discloses a vehicle including a display device located in front of a driver's seat for displaying the speed, the rotation speed, and the like, and a display device located on a side closer to a passenger seat for displaying map information, a movie, and the like.

SUMMARY

As the number of display devices mounted on a vehicle increases, an increase in power consumption by the display devices becomes a problem. It is an object of the disclosure to provide a display device including a plurality of display regions and having reduced power consumption.

A display device according to an embodiment of the disclosure includes a substrate including a main surface including a display region and a non-display region located around the display region, in which the display region includes a substrate including three or more divided regions disposed adjacent to each other along a first direction, a plurality of scanning lines disposed in each divided region, extending in the first direction, and arrayed in a second direction intersecting the first direction, a plurality of data lines disposed in each divided region, extending in the second direction, and arrayed in the first direction, a plurality of pixels disposed in each divided region, each of the plurality of pixels being disposed in a region surrounded by a pair of the data lines of the plurality of data lines and a pair of the scanning lines of the plurality of scanning lines, a plurality of scanning line connection wiring lines disposed in each divided region, extending in the second direction, and arrayed in the first direction, a plurality of data line drive circuits connected to the plurality of data lines, respectively, in each divided region, and a plurality of scanning line drive circuits corresponding to each divided region. The plurality of scanning line drive circuits and the plurality of data line drive circuits are respectively arrayed in the first direction outside the display region, each of the scanning line connection wiring lines electrically connects the scanning line drive circuit to one of the plurality of scanning lines, and the scanning line drive circuit and the data line drive circuit display an image in at least one of the three or more divided regions at a frame frequency different from a frame frequency of the other divided regions.

According to an embodiment of the disclosure, a display device including a plurality of display regions and having reduced power consumption is provided.

BRIEF DESCRIPTION OF DRAWINGS

The disclosure will be described with reference to the accompanying drawings, wherein like numbers reference like elements.

Figure 7:
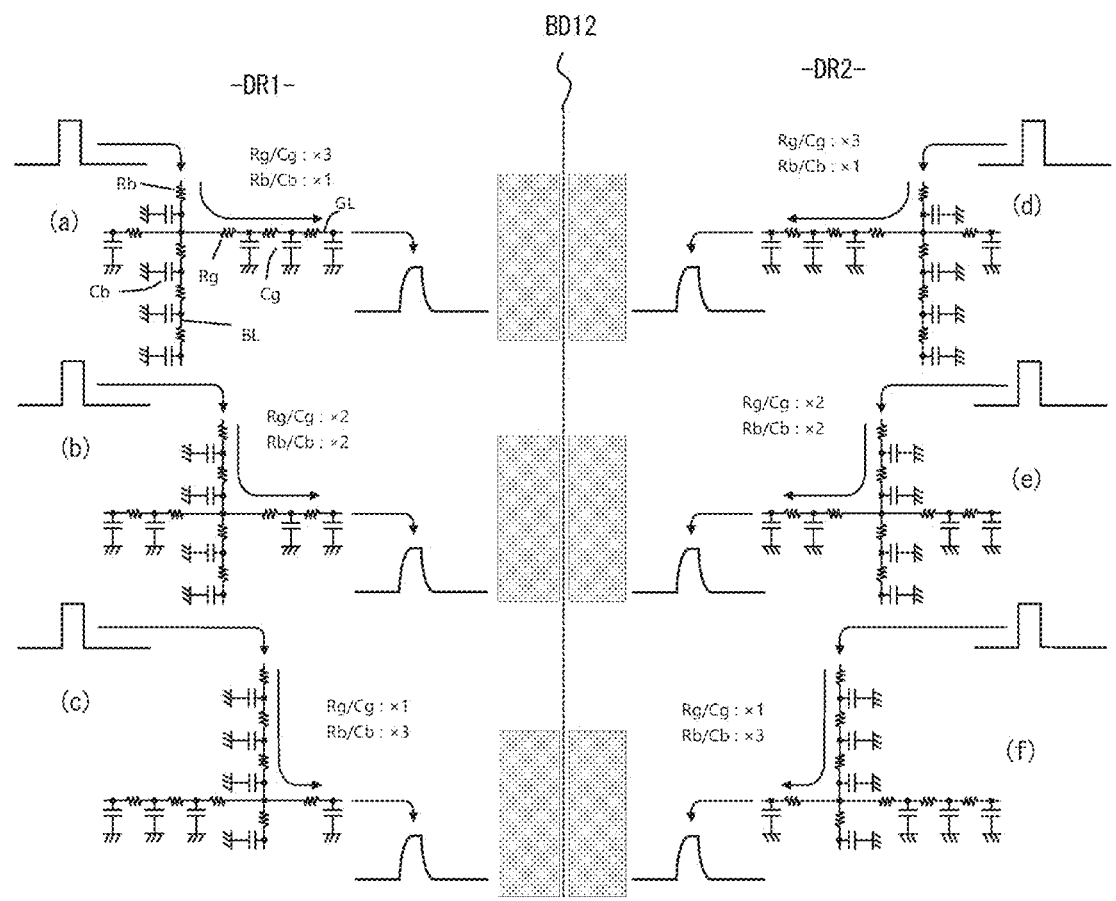

(a) to (c) and (d) to (f) of FIG. 7 are schematic diagrams respectively illustrating an equivalent circuit diagram of luminance of a pixel in the vicinity of a boundary line between a first divided region and a second divided region, an applied scanning signal, a parasitic capacitance, and a parasitic resistance.

Figure 8:
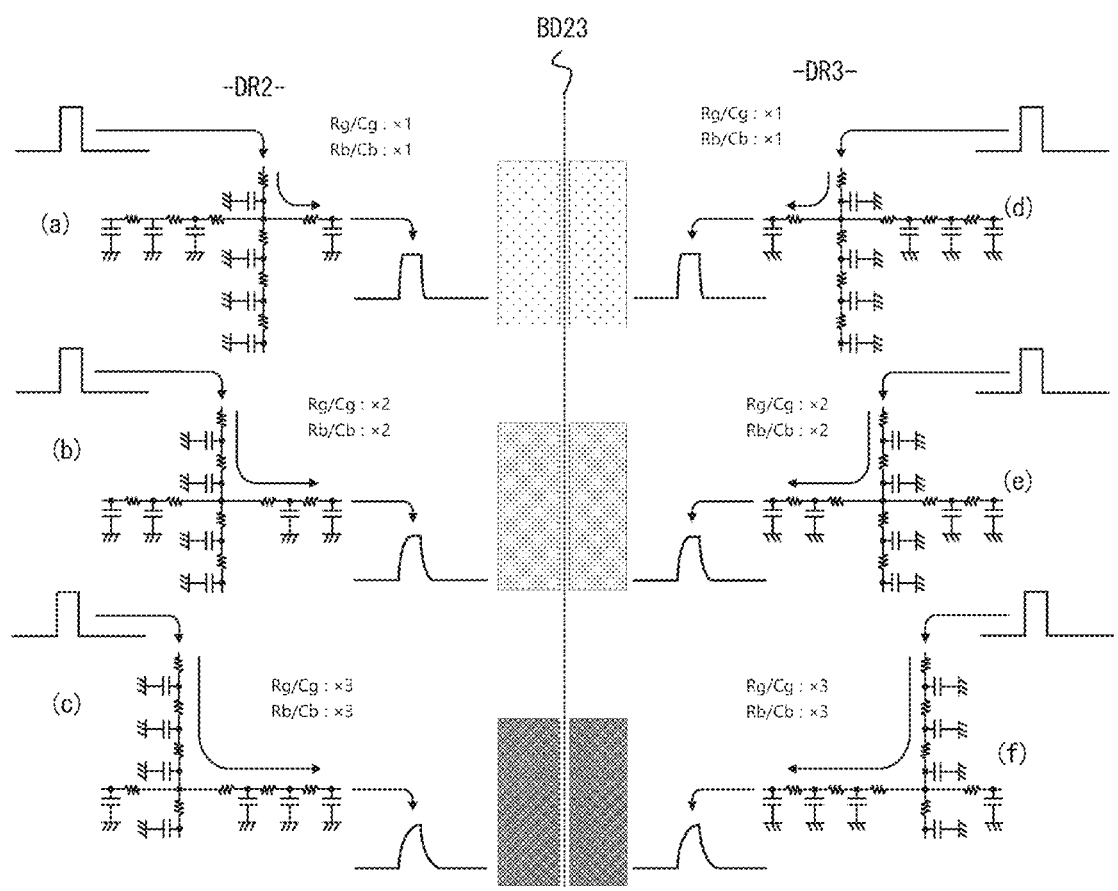

(a) to (c) and (d) to (f) of FIG. 8 are schematic diagrams respectively illustrating an equivalent circuit diagram of luminance of a pixel in the vicinity of a boundary line between a second divided region and a third divided region, an applied scanning signal, a parasitic capacitance, and a parasitic resistance.

Figure 9:
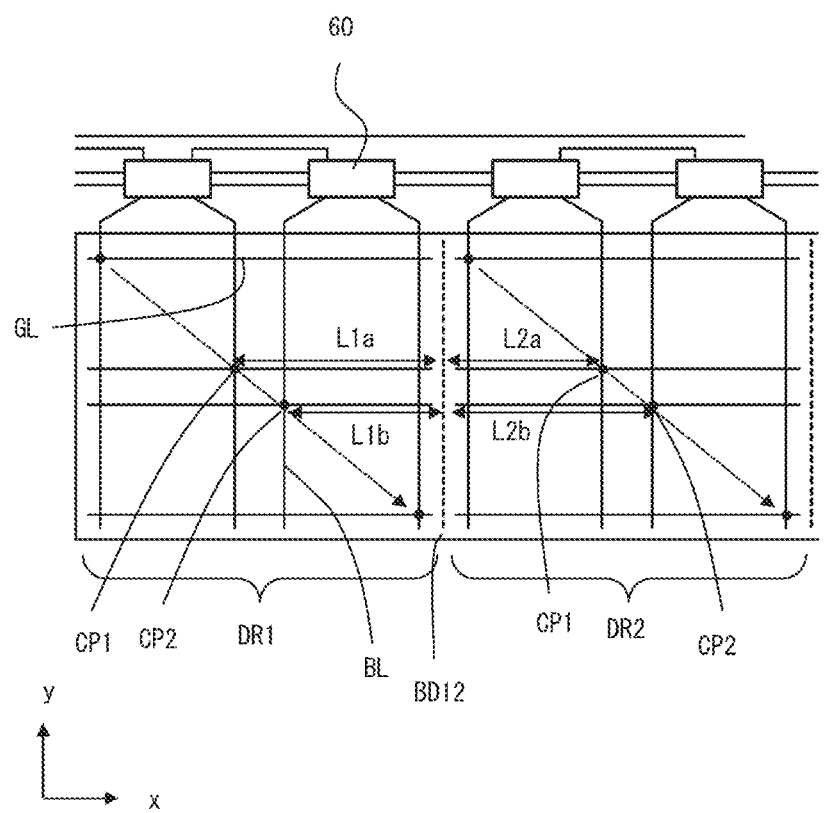

FIG. 9 illustrates another arrangement example of the scanning lines, the scanning line connection wiring lines, and the connection points CP.

Figure 10:
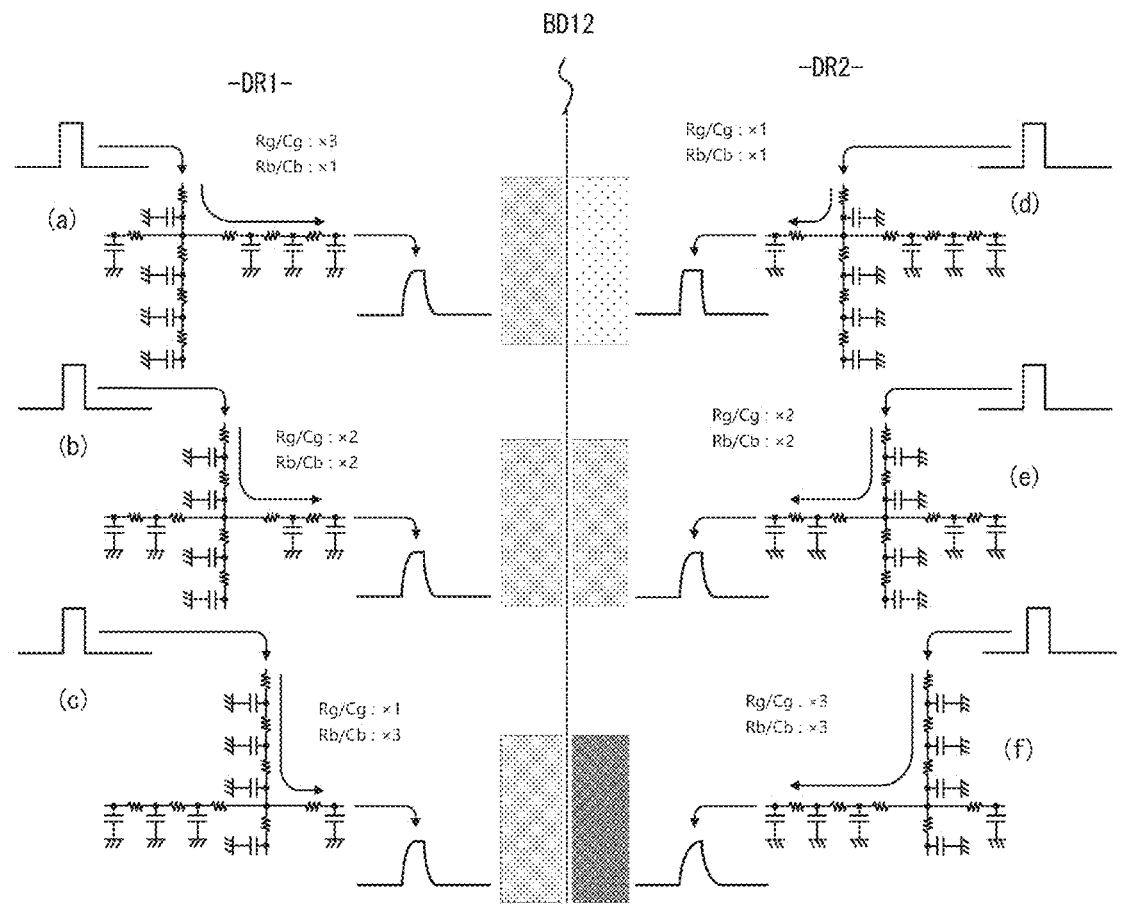

(a) to (c) and (d) to (f) of FIG. 10 are schematic diagrams respectively illustrating an equivalent circuit diagram of luminance of a pixel in the vicinity of a boundary line between a first divided region and a second divided region, an applied scanning signal, a parasitic capacitance, and a parasitic resistance in the arrangement example illustrated in FIG. 9.

Figure 11:
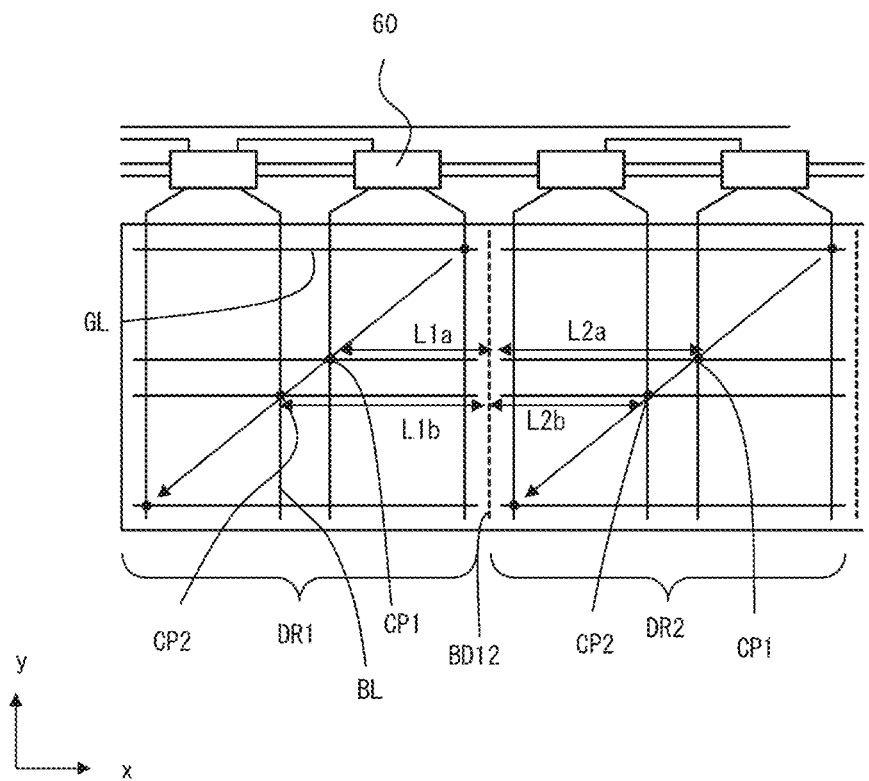

FIG. 11 illustrates another arrangement example of the scanning lines, the scanning line connection wiring lines, and the connection points CP.

Figure 12:
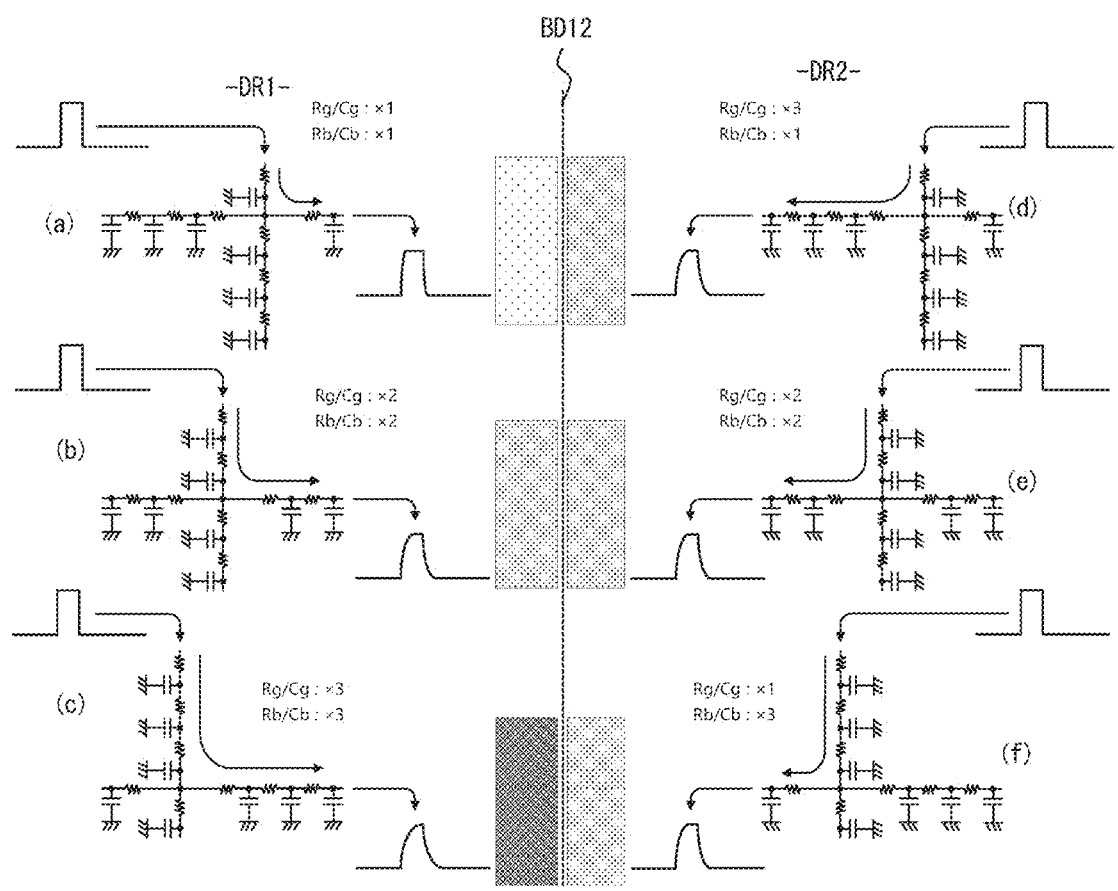

(a) to (c) and (d) to (f) of FIG. 12 are schematic diagrams respectively illustrating an equivalent circuit diagram of luminance of a pixel in the vicinity of a boundary line between a first divided region and a second divided region, an applied scanning signal, a parasitic capacitance, and a parasitic resistance in the arrangement example illustrated in FIG. 11.

Figure 13A:
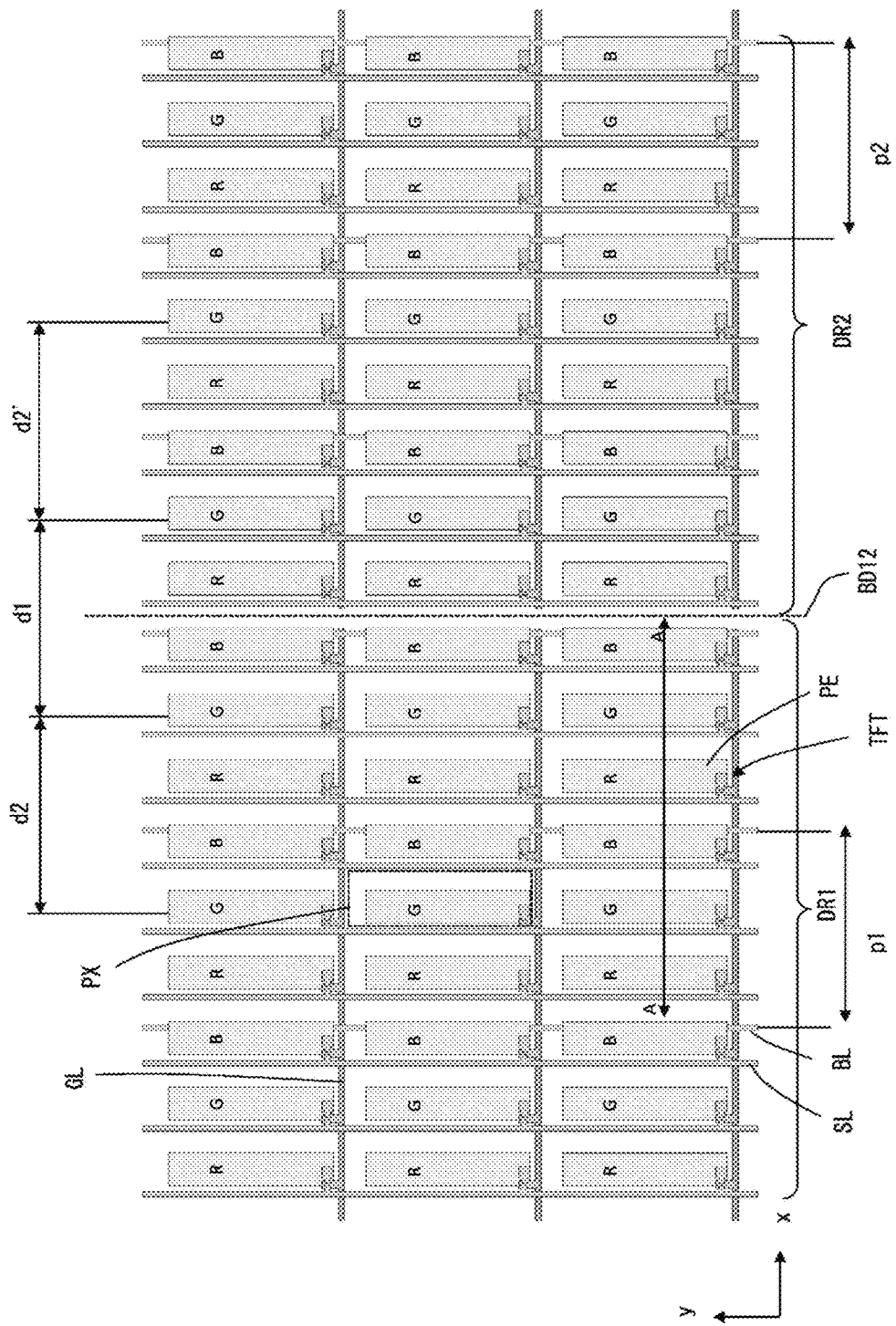

FIG. 13A is an enlarged plan view illustrating a part of the active matrix substrate.

Figure 13B:
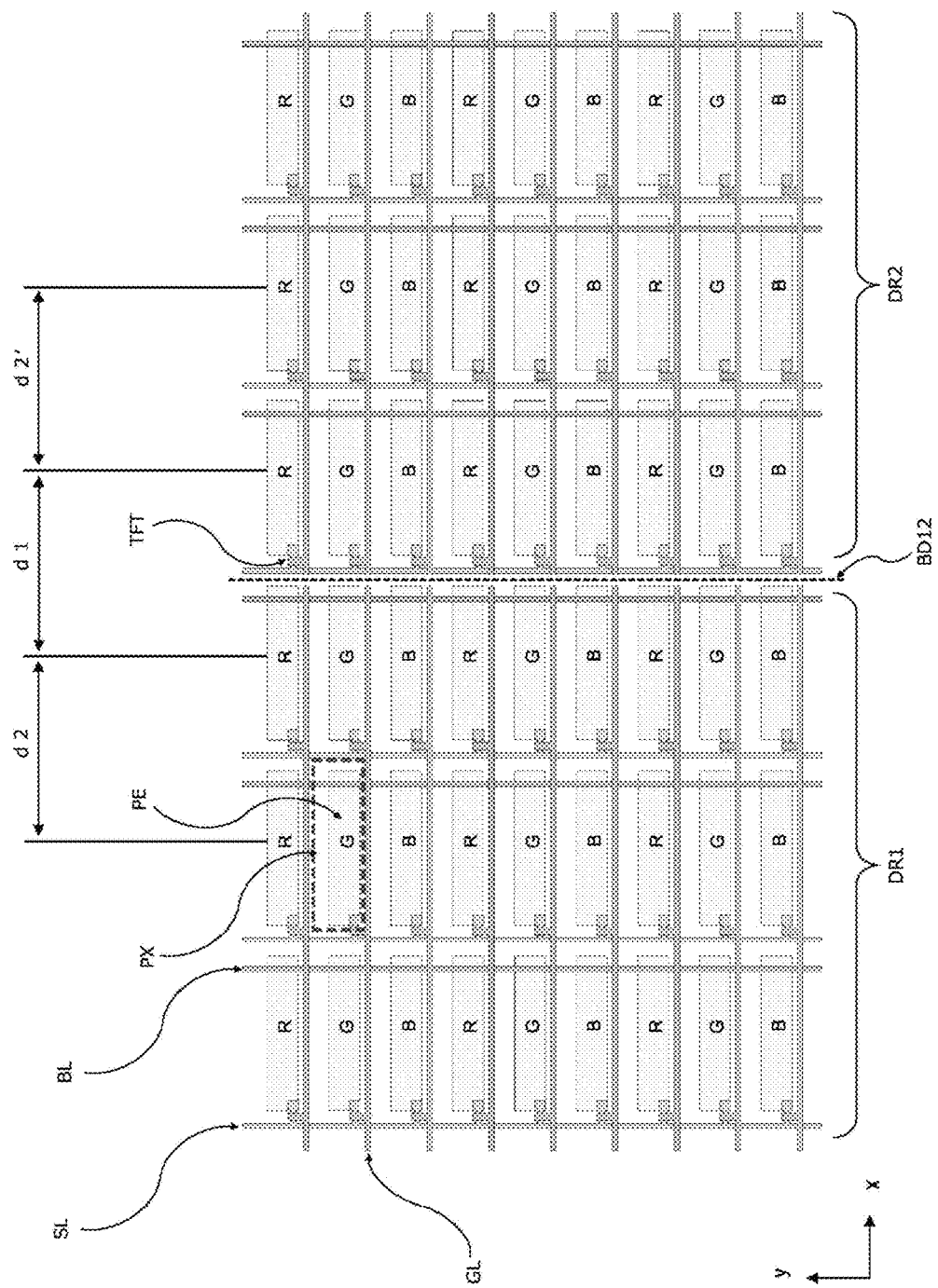

FIG. 13B is an enlarged plan view illustrating a part of another configuration example of the active matrix substrate.

Figure 14:
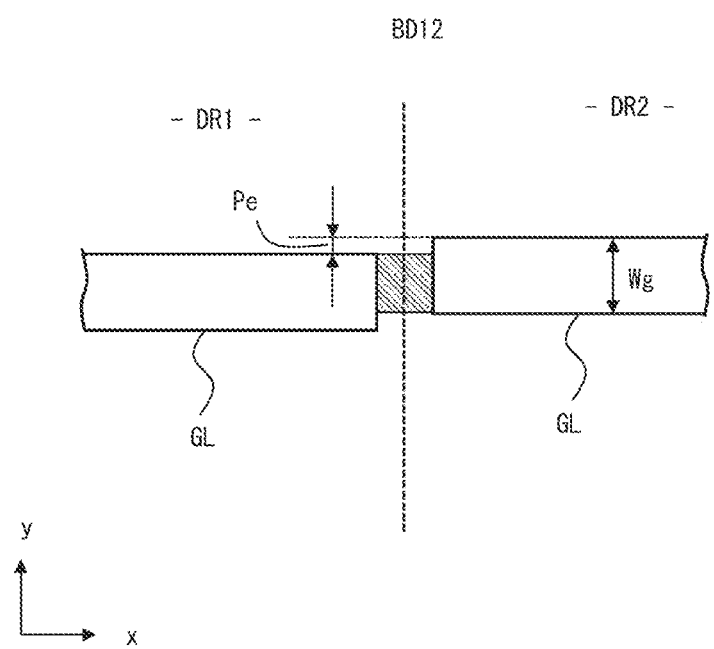

FIG. 14 is a view for explaining overlapping of scanning lines between divided regions adjacent to each other.

Figure 15:
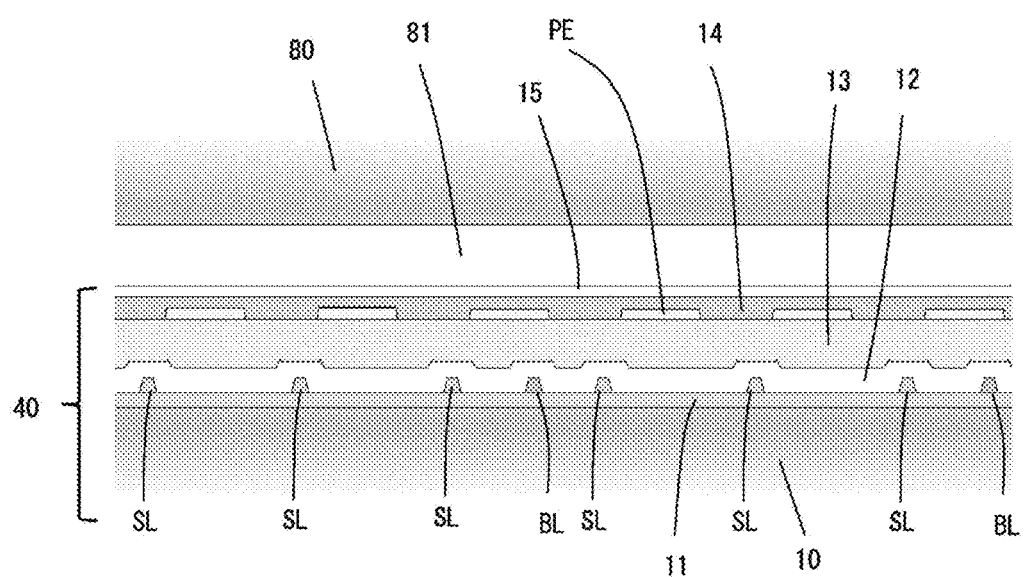

FIG. 15 illustrates an example of a cross-sectional structure of a liquid crystal display device taken along line A-A in FIG. 13.

Figure 16:
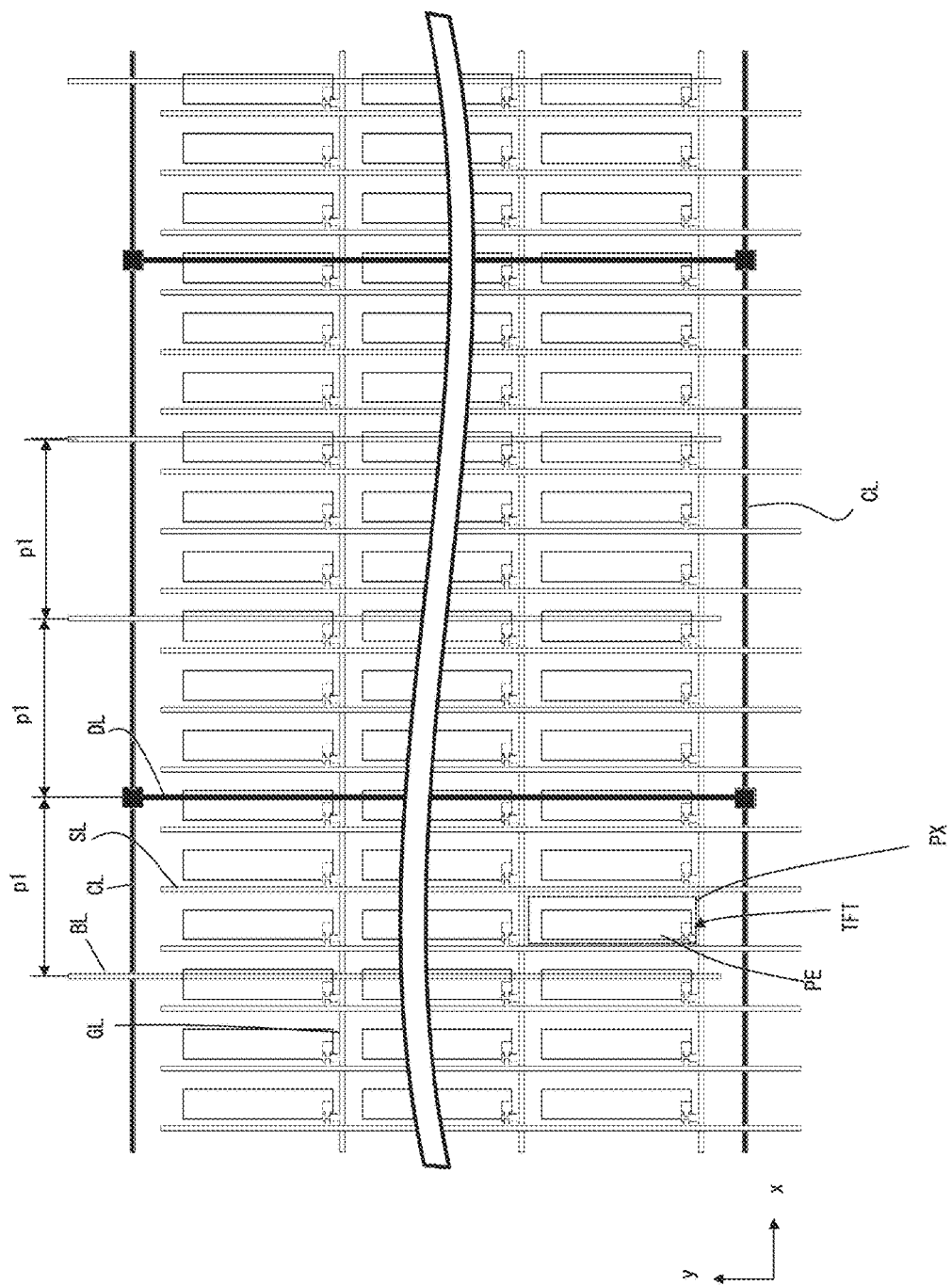

FIG. 16 is a schematic enlarged plan view of the active matrix substrate further including dummy scanning line connection wiring lines.

Figure 17:
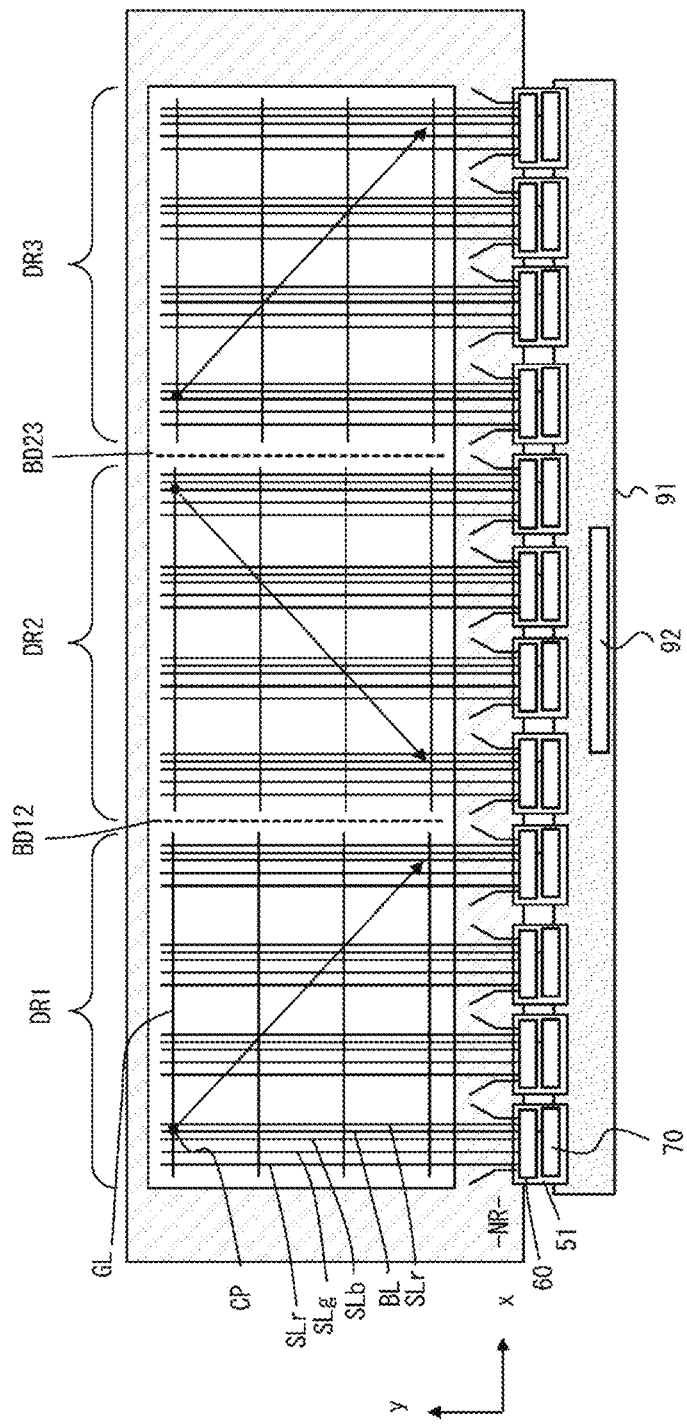

FIG. 17 is a plan view illustrating an arrangement example of scanning line drive circuits.

Figure 18:
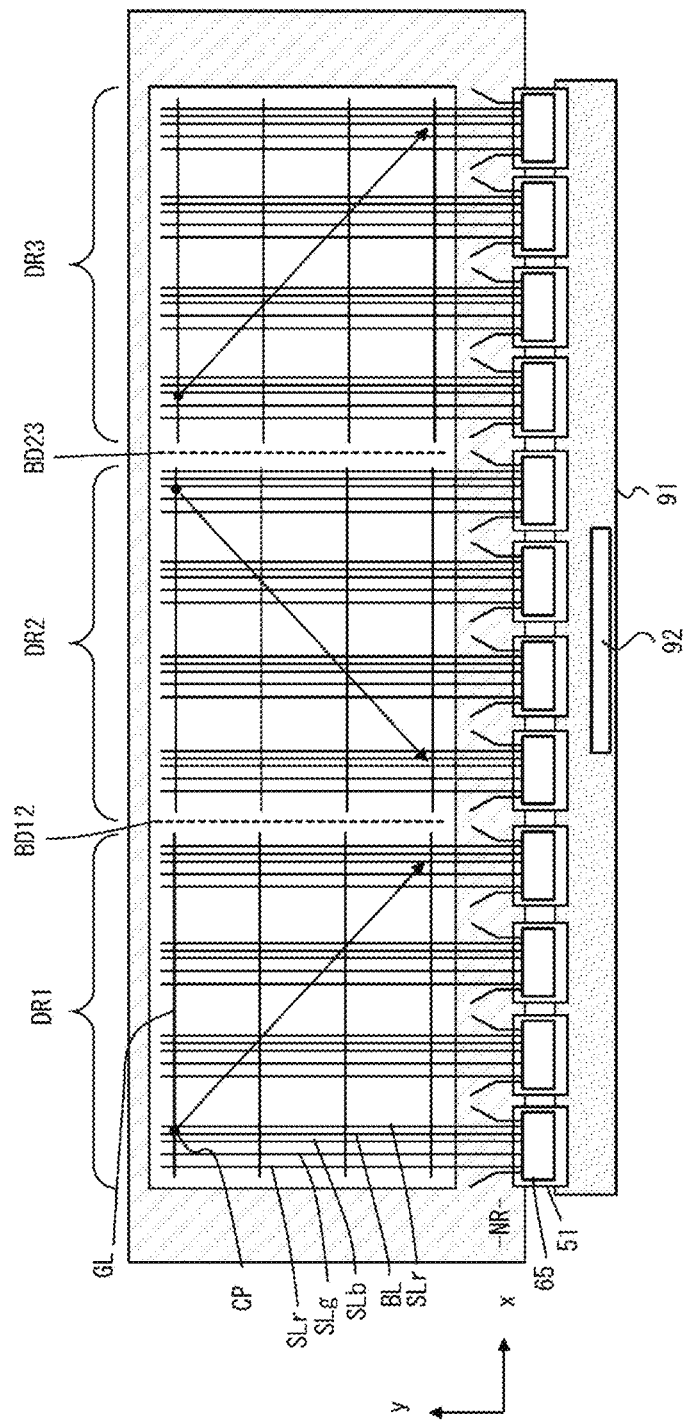

FIG. 18 is a plan view illustrating another arrangement example of the scanning line drive circuits.

DESCRIPTION OF EMBODIMENTS

When there are a plurality of display devices mounted on a vehicle, if the display devices can be collectively disposed at one place so that the display regions are connected to each other, then it is considered that an excellent design can be provided, for example, displaying an integrated image in the plurality of display regions as necessary. For example, when, as disclosed in JP 2022-072294 A, a display device for displaying a speed, a rotation speed, and the like is integrated with a display device extending from a driver's seat to a side closer to a passenger seat and displaying map information, a movie, and the like, an excellent interior design can be provided and an excellent display effect can be obtained.

On the other hand, when the number of display regions of the display device increases and the area of the entire display region increases, power consumption may also increase. In a vehicle such as a hybrid vehicle or an electric vehicle using a motor as a driving source, it is preferable that power consumption of the display device be low so as to extend a cruising distance as much as possible. The disclosure has been made in light of such a problem and conceives a novel display device capable of suppressing power consumption.

Embodiments of the disclosure will be described below with reference to the drawings. The disclosure is not limited to the following embodiments, and appropriate design changes can be made within a scope that satisfies the configuration of the disclosure. Further, in the description below, the same reference signs may be used in common among the different drawings for the same portions or portions having the same or similar functions, and descriptions of repetitions thereof may be omitted. Further, the configurations described in the embodiments and the modified examples may be combined or modified as appropriate within a range that does not depart from the gist of the disclosure. For ease of explanation, in the drawings referenced below, configurations may be simplified or schematically illustrated, or a portion of the components may be omitted. Further, dimensional ratios between components illustrated in the drawings are not necessarily indicative of actual dimensional ratios.

Figure 1:
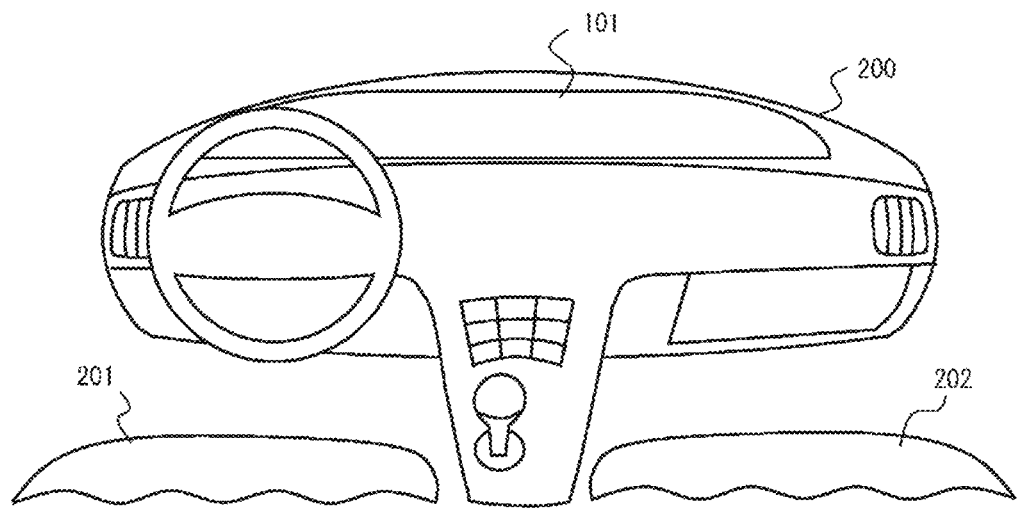
FIG. 1 is a schematic view illustrating a dashboard of a vehicle on which a display device of the present embodiment is mounted.

FIG. 1 is a schematic view illustrating a dashboard 200 of a vehicle on which a display device 101 of the present embodiment is mounted. The dashboard 200 is located at the front of the interior of the vehicle. The display device 101 is disposed in an upper portion of the dashboard 200 from a driver's seat 201 to a passenger seat 202. That is, the display device 101 is located in front of the driver's seat 201 and the passenger seat 202 and is an integrated device.

The display device 101 may be any of various flat displays. For example, the display device 101 may be a liquid crystal display device, an organic EL display device, an LED display device, electronic paper, or the like. In the present embodiment, the display device 101 is the liquid crystal display device.

Figure 2A:
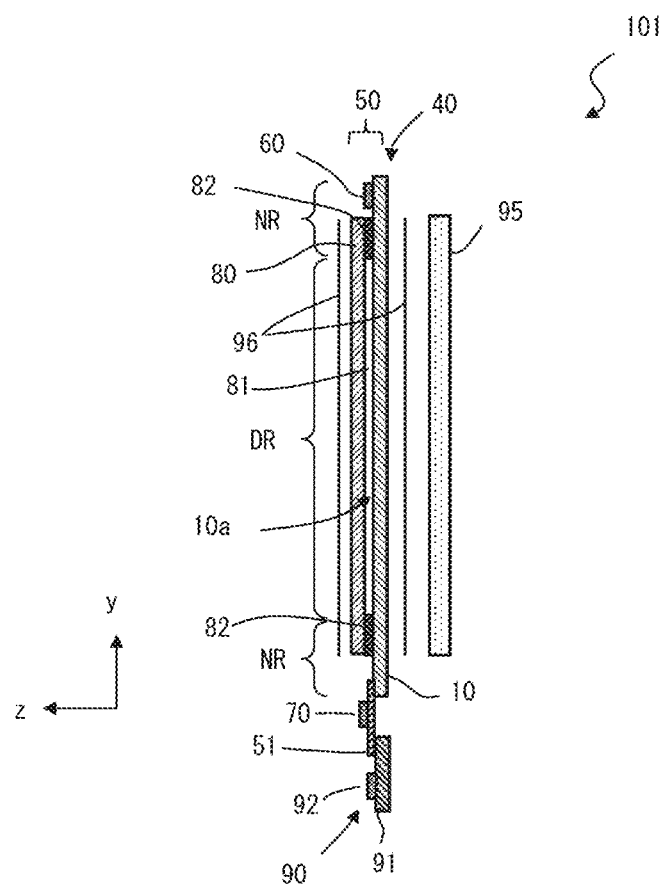
FIG. 2A is a schematic cross-sectional view illustrating a configuration of the display device.

FIG. 2A is a schematic cross-sectional view illustrating a configuration in a case in which the display device 101 is the liquid crystal display device. The display device 101 includes a liquid crystal panel 50 and a control device 90. The liquid crystal panel 50 includes an active matrix substrate 40, a counter substrate 80, and a liquid crystal layer 81.

The active matrix substrate 40 includes a substrate 10 with a main surface 10a. As described in detail below, the main surface 10a includes a display region DR, and a non-display region NR located around the display region DR so as to surround the display region DR. The display region DR is a region that contributes to image display, and the non-display region is a region that does not display an image.

As described in detail below, the active matrix substrate 40 includes a plurality of scanning lines, a plurality of data lines, and a plurality of pixels. Each pixel is connected to one of the plurality of scanning lines and one of the plurality of data lines.

The active matrix substrate 40 and the counter substrate 80 are bonded to each other at a predetermined distance by a seal 82 disposed on the non-display region NR, and the liquid crystal layer 81 is disposed in a region surrounded by the seal 82 and between the active matrix substrate 40 and the counter substrate 80. In the present embodiment, a color filter is provided on a surface of the counter substrate 30 on a side closer to the liquid crystal layer 81. However, the color filter may be provided on the active matrix substrate 40.

Figure 2B:
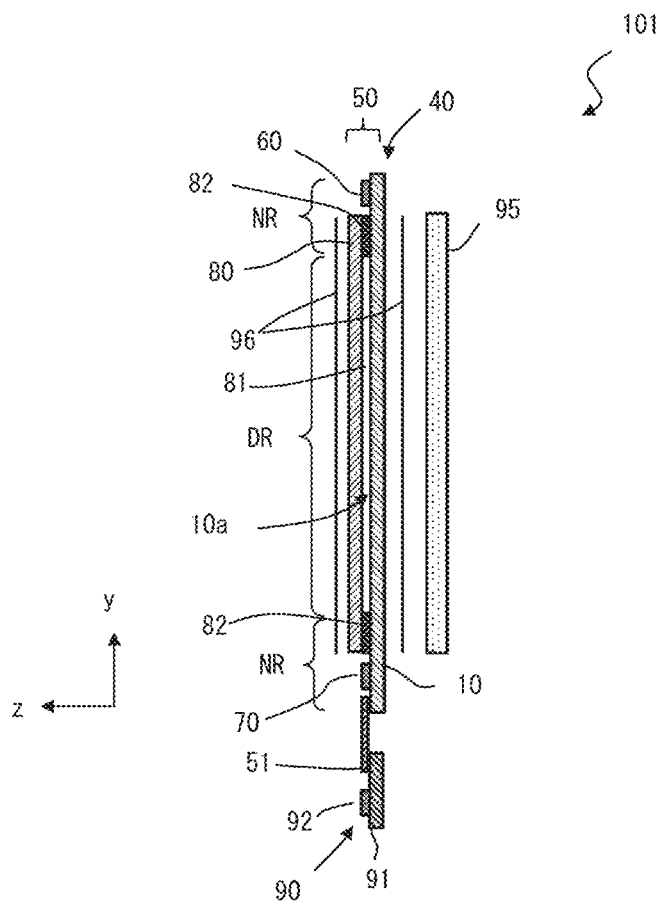
FIG. 2B is a schematic cross-sectional view illustrating another configuration of the display device.

The liquid crystal panel 50 further includes a plurality of scanning line drive circuits 60 and a plurality of data line drive circuits 70. The scanning line drive circuits 60 and the data line drive circuits 70 are disposed in regions other than the display region DR of the substrate 10 and drive the scanning lines and the data lines, respectively. In the present embodiment, the scanning line drive circuits 60 are disposed in the non-display region NR. On the other hand, the data line drive circuits 70 are disposed on a flexible substrate 51. As illustrated in FIG. 2B, the plurality of data line drive circuits 70 may be mounted in the non-display region NR of the substrate 10.

The control device 90 includes a substrate 91 and a timing controller 92 mounted on the substrate 91. The control device 90 is connected to the active matrix substrate 40 by the flexible substrate 51. The timing controller 92 receives an image signal from an external host computer and generates a scanning signal and a data signal. The generated scanning signal and data signal are output to the scanning line drive circuit 60 and the data line drive circuit 70, respectively.

The display device 101 further includes a pair of polarizers 96 and a backlight 95. The pair of polarizers 96 are located so as to sandwich the active matrix substrate 40 and the counter substrate 80. The backlight 95 is disposed so as to face one of the pair of polarizers 96.

Figure 3:
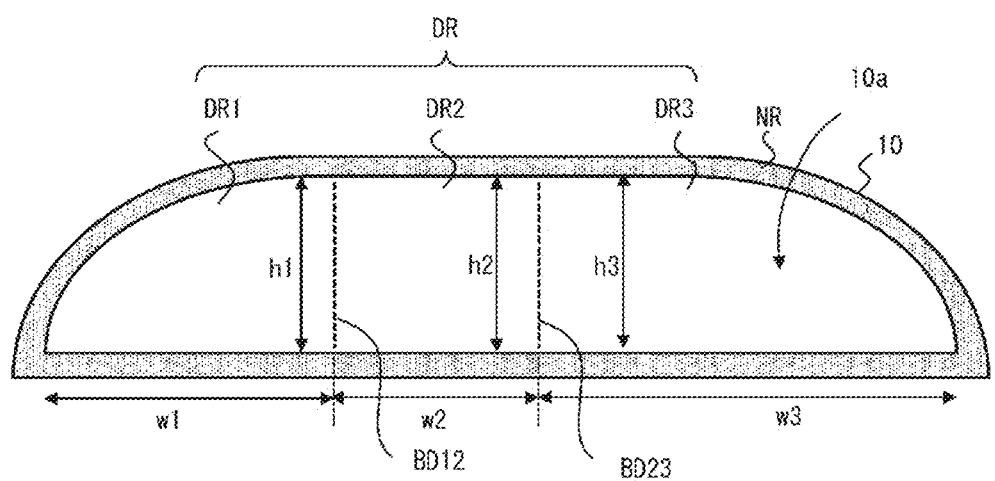
FIG. 3 is a plan view of a substrate.

FIG. 3 is a plan view of the substrate 10. The substrate 10 has a longitudinal direction in an x-axis direction (first direction) which is a lateral direction rather than a y-axis direction (second direction) which is a vertical direction. The shape of the substrate 10 is not particularly limited as long as the first direction is the longitudinal direction, and may be, for example, a rectangle, an ellipse, or an oval. In the present embodiment, the substrate 10 has a shape obtained by rounding two upper corners arranged in the x-axis direction in a rectangle whose x-axis direction is the longitudinal direction.

The main surface 10a includes the display region DR and non-display region NR as described above. In the present embodiment, the display region DR has a shape substantially similar to the outer shape of the substrate 10, that is, a shape obtained by rounding two upper corners arranged in the x-axis direction in a rectangle whose x-axis direction is the longitudinal direction. The non-display region NR is located around the display region DR. In the present embodiment, the non-display region NR surrounds the display region DR.

The display region DR includes three or more divided regions disposed adjacent to each other along the x-axis direction. In the present embodiment, the display region DR includes a first divided region DR1, a second divided region DR2, and a third divided region DR3. The second divided region DR2 is located between the first divided region DR1 and the third divided region DR3, and the third divided region DR3 is located on a positive side of the first divided region DR1 in the x-axis direction. The first divided region DR1 and the second divided region DR2 are separated by a boundary line BD12, and the second divided region DR2 and the third divided region DR3 are separated by a boundary line BD23. The boundary line BD12 and the boundary line BD23 are parallel to the y-axis direction.

Each of the first divided region DR1 and the third divided region DR3 has a shape obtained by rounding one corner of a rectangle, whereas the second divided region DR2 has a rectangular shape. Thus, in the present embodiment, shapes of two divided regions adjacent to each other are different from each other in the display region DR.

As illustrated in FIG. 3, in each divided region, the maximum width in the x-axis direction is larger than the maximum height in the y-axis direction. In the first divided region DR1, the maximum width w1 is larger than the maximum height h1.

Similarly, in the second divided region DR2, the maximum width w2 is larger than the maximum height h2, and in the third divided region DR3, the maximum width w3 is larger than the maximum height h3. In other words, relationships of $w1>h1$, $w2>h2$, and $w3>h3$ are satisfied. In the present embodiment, $h1=h2=h3$, and a relationship of $w3>w1>w2$ is satisfied.

Figure 4A:
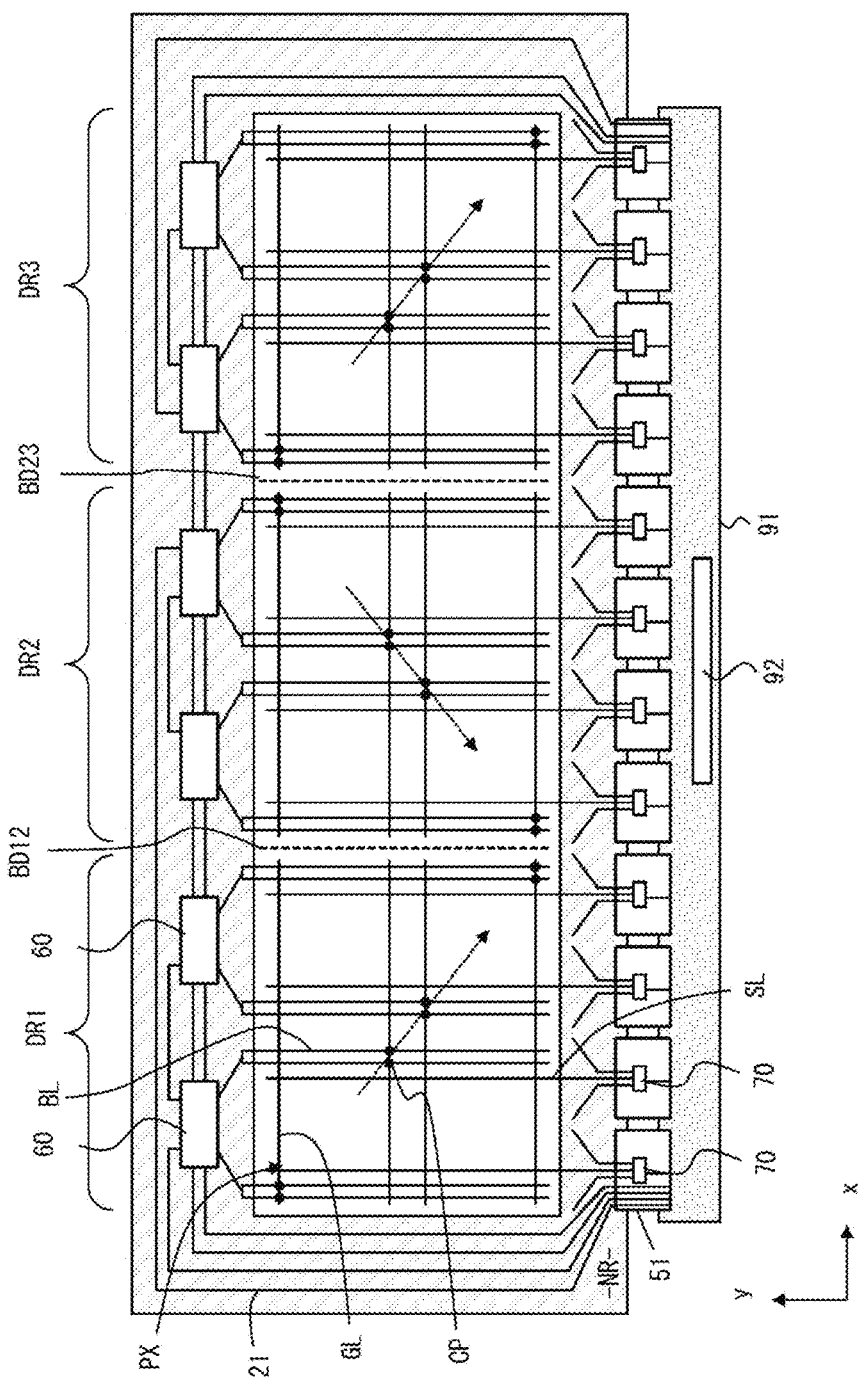
FIG. 4A is a schematic plan view of an active matrix substrate.

FIG. 4A is a schematic plan view of the active matrix substrate 40. In FIG. 4A, for ease of understanding, the first divided region DR1 and the second divided region DR2 are illustrated as rectangles. For the sake of description, the first divided region DR1, the second divided region DR2, and the third divided region DR3 are illustrated in the same shape.

The active matrix substrate 40 includes a plurality of scanning lines GL, a plurality of data lines SL, a plurality of scanning line connection wiring lines BL, and a plurality of pixels PX in each of the first divided region DR1, the second divided region DR2, and the third divided region DR3.

In each divided region, the plurality of scanning lines GL extend in the x-axis direction and are arrayed in the y-axis direction. The plurality of data lines SL extend in the y-axis direction and are arrayed in the x-axis direction. The plurality of scanning line connection wiring lines BL extend in the y-axis direction and are arrayed in the x-axis direction. The scanning lines GL in each divided region are not connected to the scanning lines GL in an adjacent divided region.

Figure 5:
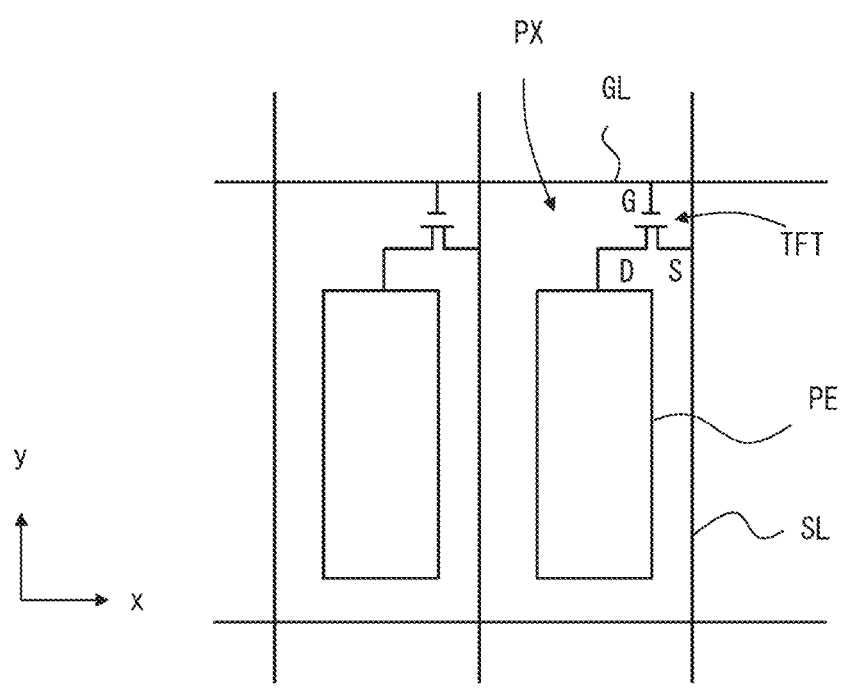
FIG. 5 is a circuit diagram illustrating a configuration example of pixels.

FIG. 5 is a circuit diagram illustrating a configuration example of the pixels PX. Each pixel PX is disposed in a region surrounded by a pair of data lines SL of the plurality of data lines SL and a pair of scanning lines GL of the plurality of scanning lines GL. The pixel PX includes a TFT and a pixel electrode PE. Specifically, a gate electrode of the TFT is connected to the scanning line GL, a source electrode is connected to the data line SL, and a drain electrode D is connected to the pixel electrode.

As illustrated in FIG. 4A, the plurality of scanning line drive circuits 60 are disposed to correspond to each of the first divided region DR1, the second divided region DR2, and the third divided region DR3. The plurality of data line drive circuits 70 are also disposed to correspond to each of the first divided region DR1, the second divided region DR2, and the third divided region DR3.

Figure 4B:
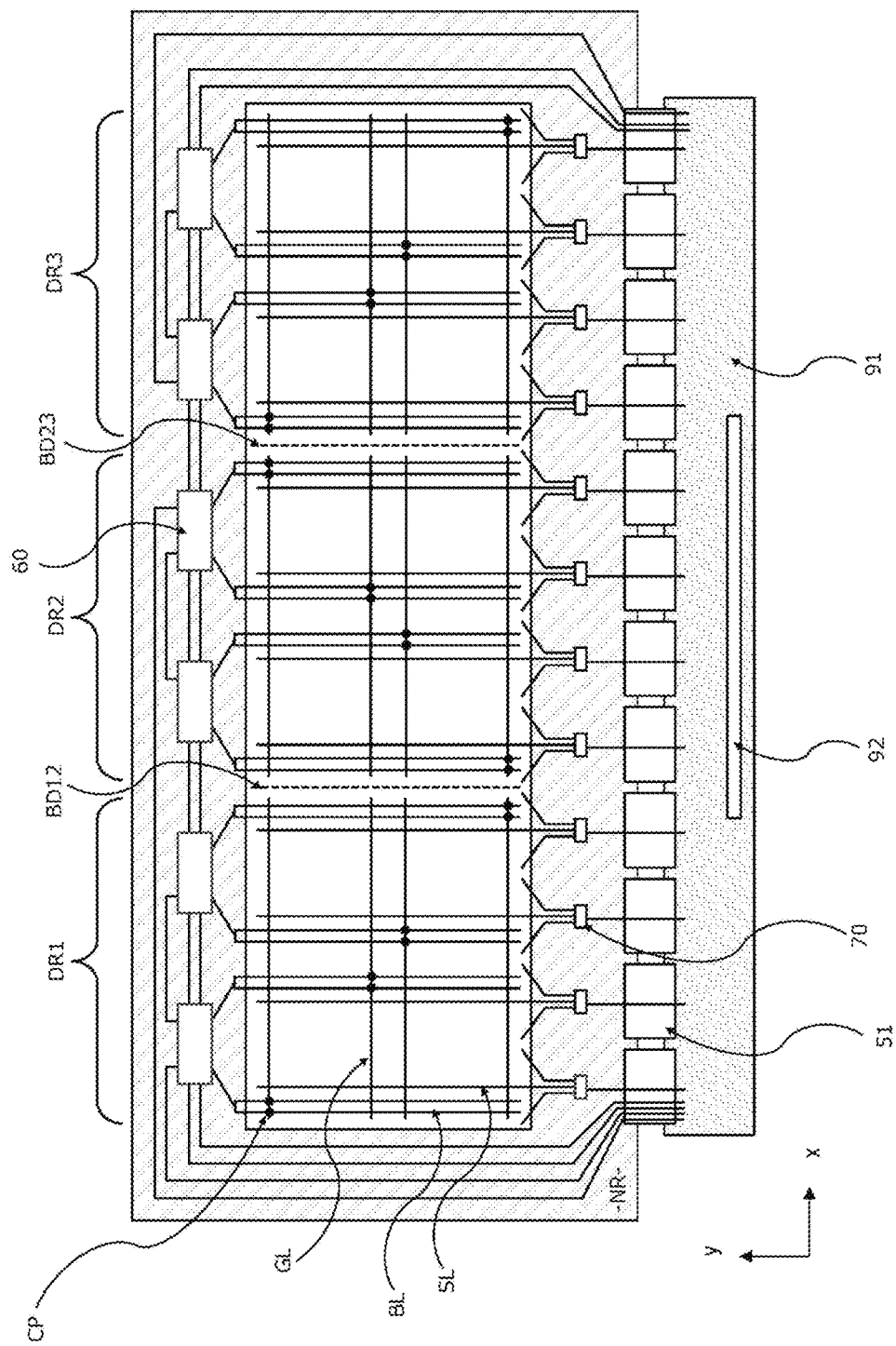
FIG. 4B is a schematic plan view of another configuration example of the active matrix substrate.

The plurality of scanning line drive circuits 60 and the plurality of data line drive circuits 70 are respectively arrayed in the x-axis direction outside the display region DR. In the present embodiment, the scanning line drive circuits 60 and the data line drive circuits 70 are located across a respective one of the first divided region DR1, the second divided region DR2, and the third divided region DR3, and are arrayed in the x-axis direction. The scanning line drive circuits 60 are disposed in the non-display region NR located on a positive side of each divided region in the y-axis direction. On the other hand, the data line drive circuits 70 are disposed on the flexible substrate 51 connected to the non-display region NR located on a negative side of each divided region in the y-axis direction. However, as illustrated in FIG. 4B, the plurality of data line drive circuits 70 may be disposed in the non-display region NR.

In the present embodiment, the scanning line drive circuit 60 is integrally (monolithically) formed on the substrate 10. For example, the scanning line drive circuit 60 includes a plurality of TFTs, and these TFTs and the TFT of the pixel PX are formed at the same time. The scanning line drive circuit 60 may be constituted by a bare chip or a packaged chip, and may be mounted in the non-display region NR of the substrate 10. The scanning line drive circuit 60 may be constituted by a bare chip or a packaged chip and mounted on a flexible substrate, and the flexible substrate may be mounted in the non-display region NR of the substrate 10.

The data line drive circuit 70 is constituted by a bare chip or a packaged chip, and is mounted on the flexible substrate 51. The data line drive circuit 70 may be constituted by a bare chip or a packaged chip, and may be mounted in the non-display region NR of the substrate 10.

In FIG. 4A, in each divided region, the scanning line drive circuits 60 are illustrated as two elements, but the number of the scanning line drive circuits in each divided region may be one or three or more. The same applies to the data line drive circuits 70. In each divided region, the data line drive circuits 70 are illustrated as four elements, but the number of the scanning line drive circuits in each divided region may be from one to three or five or more.

In each divided region, one end of each of the plurality of data lines SL extends to the non-display region NR and is connected to the data line drive circuit 70 via a wiring line formed on the flexible substrate 51. One end of each of the plurality of scanning line connection wiring lines BL extends to the non-display region NR and is connected to the scanning line drive circuit 60 in each divided region. Each of the plurality of scanning line connection wiring lines BL is connected at a connection point CP disposed at a position of intersection with one of the plurality of scanning lines GL. In the present embodiment, for redundancy, a pair of scanning line connection wiring lines BL adjacent to each other are connected to the same scanning line GL. The same scanning signal is applied to the pair of scanning line connection wiring lines BL adjacent to each other. With such a configuration, even when one scanning line connection wiring line BL is disconnected or the connection between the scanning line connection wiring line BL and the scanning line GL at the connection point CP is defective at the time of manufacturing the display device 101, the connection between the scanning line drive circuit and the scanning line GL can be secured by the other scanning line connection wiring line BL.

Since the scanning line connection wiring line BL is disposed in the pixel as described later, an aperture ratio of the pixel decreases. Thus, the scanning line connection wiring line BL preferably extends in the y-axis direction from a side closer to the scanning line drive circuit 60 to the opposite side of the scanning line drive circuit 60 beyond the connection point CP so that the aperture ratios of the pixels arrayed in the y-axis direction do not largely change. For example, in each divided region, each of 70% or more of the scanning line connection wiring lines of the plurality of scanning line connection wiring lines preferably has a length of 70% or more of the width of the display region in the y-axis direction.

The number of the plurality of scanning lines GL disposed in one of a pair of divided regions adjacent to each other is preferably equal to the number of the plurality of scanning lines GL disposed in the other of the pair of divided regions. Accordingly, the number of pixels in the y-axis direction is equal in the pair of divided regions adjacent to each other. When the heights of the divided regions in the y-axis direction are equal to each other, in a case in which one integrated image is displayed in the first divided region DR1, the second divided region DR2, and the third divided region DR3, that is, in the entire display region DR, the image can be displayed with a uniform pixel density in the entire display region.

The timing controller 92 is electrically connected to the scanning line drive circuit 60 by the flexible substrate 51 connected to the substrate 91 and a wiring line 21 disposed in the non-display region NR of the substrate 10. Similarly, the timing controller 92 is electrically connected to the data line drive circuit 70 by the wiring line of the flexible substrate 51.

The timing controller 92 outputs a scanning line drive circuit control signal necessary for generating a scanning signal to the scanning line drive circuit 60 in each divided region and outputs an image signal as a source of the data signal to the data line drive circuit 70 in order to display an independent image in each of the first divided region DR1, the second divided region DR2, and the third divided region DR3. For example, in order to display a first image in the first divided region DR1, a first scanning line drive circuit control signal and a first image signal are output to the scanning line drive circuit 60 and the data line drive circuit 70, respectively. Similarly, in order to display a second image in the second divided region DR2, a second scanning line drive circuit control signal and a second image signal are output to the scanning line drive circuit 60 and the data line drive circuit 70, respectively. In order to display a third image in the third divided region DR3, a third scanning line drive circuit control signal and a third image signal are output to the scanning line drive circuit 60 and the data line drive circuit 70, respectively. Although the timing controller 92 is illustrated as one element in FIG. 4A, the timing controller 92 may be divided into three elements each corresponding to a respective one of the divided regions.

The timing controller 92 generates each of the scanning line drive circuit control signals and the image signal and controls the scanning line drive circuit 60 and the data line drive circuit 70 so that at least one of the first image, the second image, and the third image is displayed at a frame frequency different from that of the other two images. For example, the first image is an image displaying various meters of the automobile, such as a speedometer and a tachometer, and includes a fast motion image. Thus, the first image is displayed at a frame frequency of 120 Hz. The second image is an image of map information obtained by a car-navigation system, and there are few fast motion image changes. Thus, the second image is displayed at a frame frequency of 10 Hz. The third image is a general TV or video image such as a relay image of sports. Thus, the third image is displayed at a frame frequency of 60 Hz.

According to the display device 101, an image can be displayed in some of the divided regions of the display region DR at a frame frequency different from that of the other regions. Thus, power consumption can be reduced by lowering the frame frequency of the image displayed in some of the divided regions. At this time, by displaying an image at a high frame frequency in the other divided regions, smooth display can be performed even in the case of fast motion, and both high quality display and low power consumption can be achieved.

Since the plurality of scanning line drive circuits are arrayed in the x-axis direction outside the display region, and the scanning line and the scanning line drive circuit are electrically connected to each other using the scanning line connection wiring line extending in the same direction as the data line, the scanning line drive circuit can be prevented from being disposed at an end portion of the scanning line, that is, at a position adjacent to the divided region in the x-axis direction. Accordingly, the divided regions adjacent to each other can be disposed in contact with each other. Thus, a break of the images displayed in the divided regions can be made not noticeable. For example, when the first image, the second image, and the third image integrally form one image, a region between the divided regions where the image is not displayed can be reduced or eliminated, and excellent display can be performed.

As described above, when the first image, the second image, and the third image integrally form one image, that is, when one image is displayed in the entire display region DR, a difference in luminance preferably does not occur at the boundary between the divided regions. In order to perform such display, the position of the connection point CP between the scanning line connection wiring line BL and the scanning line GL preferably satisfies a specific relationship between the divided regions. This relationship will be described in detail below.

Figure 6:
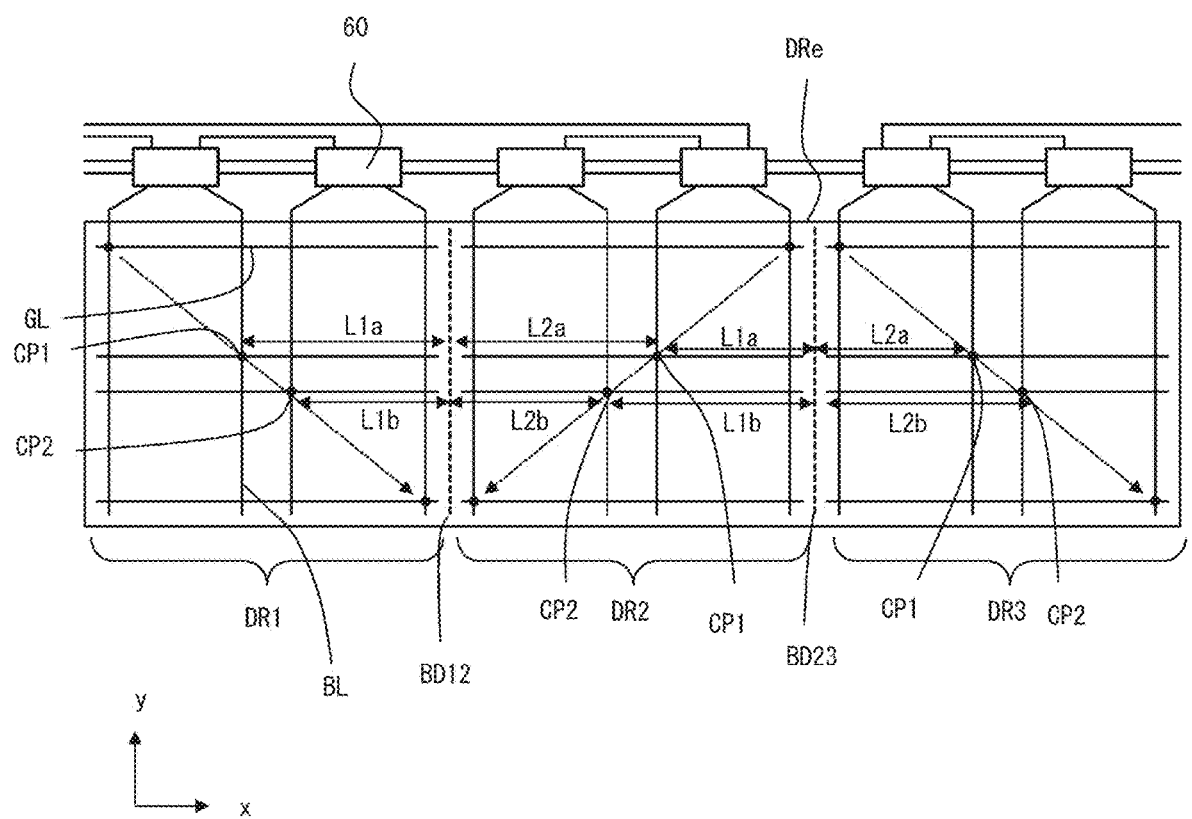
FIG. 6 illustrates an arrangement of scanning lines, scanning line connection wiring lines, and connection points CP in each divided region.

FIG. 6 illustrates an arrangement of scanning lines GL, scanning line connection wiring lines BL, and connection points CP in each divided region. In each divided region, a certain one connection point CP1 of the plurality of connection points CP which are disposed is determined, and another connection point CP2 disposed at a position farther from an upper end DRe of the display region DR than the connection point CP1 is determined.

Distances between the connection points CP1 and CP2 located in one of the pair of divided regions adjacent to each other across the boundary lines BD12 and BD23 and the boundary line are denoted by L1a and L1b, respectively, and distances between the connection points CP1 and CP2 located in the other of the pair of divided regions and the boundary line are denoted by L2a and L2b, respectively.

In the present embodiment, the distances L1a, L1b, L2a, and L2b satisfy a relationship of the following Expression (1).

$$(L1b-L1a) \times (L2b-L2a) > 0 \qquad (1)$$

For example, in FIG. 6, connection points CP1 and CP2 disposed in the first divided region DR1 and the second divided region DR2 are considered. The distances L1a, L1b, L2a, and L2b between the boundary line BD12 located between the first divided region DR1 and the second divided region DR2 and the connection points are such that L1a>L1b in the first divided region DR1 and L2a>L2b in the second divided region DR2. Thus, the relationship of Expression (1) is satisfied.

Similarly, connection points CP1 and CP2 disposed in the second divided region DR2 and the third divided region DR3 are considered. The distances L1a, L1b, L2a, and L2b between the boundary line BD23 located between the second divided region DR2 and the third divided region DR3 and the connection points are such that L1a<L1b in the second divided region DR2 and L2a<L2b in the third divided region DR3. Thus, the relationship of Expression (1) is satisfied.

That is, when the relationship of the distances between the connection points CP1 and CP2 and the boundary line is L1a>L1b or L2a>L2b with an arrangement pattern of the connection points being denoted by A, and L1a<L1b or L2a<L2b with an arrangement pattern of the connection points being denoted by B, an arrangement pattern of AA or BB on the left side and the right side of the boundary line satisfies the relationship of Expression (1).

A scanning signal for turning on/off each pixel PX output from the scanning line drive circuit is applied to the scanning line connection wiring line BL and the scanning line GL. The scanning signal has a pulse waveform when it is output from the scanning line drive circuit. However, due to a parasitic resistance and a parasitic capacitance corresponding to a distance from the scanning line drive circuit to the pixel PX, the waveform is rounded, and an effective time during which the pixel PX is turned on is shortened. As a result, the luminance of the pixel decreases in accordance with the parasitic resistance and the parasitic capacitance. In the two divided regions adjacent to each other across the boundary line, the influence of the parasitic resistance and the parasitic capacitance on the pixel in each divided region closest to the boundary line can be evaluated as follows.

As illustrated in FIG. 7, in each divided region, the scanning line GL and the scanning line connection wiring line BL are divided into four parts, and in the divided parts, parasitic resistances are denoted by Rg and Rb, respectively, and parasitic capacitances are denoted by Cg and Cb, respectively.

(a), (b) and (c) of FIG. 7 in the first divided region DR1 and (d), (e) and (f) of FIG. 7 in the second divided region DR2 schematically illustrate the position of the connection point CP between the scanning line connection wiring line BL and the scanning line GL, and the parasitic resistances Rg and Rb and the parasitic capacitances Cg and Cb located from the scanning line drive circuit to the pixel adjacent to the boundary line BD12 and affecting the scanning line. Each of (a) and (d) illustrates the scanning line GL in an upper portion of a respective one of the divided region in the y-axis direction, each of (b) and (e) illustrates the scanning line GL in a central portion of a respective one of the divided region in the y-axis direction, and each of (c) and (f) illustrates the scanning line GL in a lower portion of a respective one of the divided region in the y-axis direction.

As illustrated in FIG. 7, when it is assumed that Rg/Cg and Rb/Cb are equal to each other, the parasitic resistance and the parasitic capacitance affecting the pixel adjacent to the boundary line BD12 correspond to four of Rg/Cg or Rb/Cb in any of (a) to (f). Thus, the rounding of the waveform of the scanning signal applied to the pixel closest to the boundary line BD12 in the first divided region DR1 and the rounding of the waveform of the scanning signal applied to the pixel closest to the boundary line BD12 in the second divided region DR2 are substantially the same, and the pixels are affected by the parasitic resistance and the parasitic capacitance to substantially the same extent. Thus, the decrease in luminance of the pixels due to the parasitic resistance and the parasitic capacitance is also substantially the same, and the pixels emit light with substantially the same luminance. In FIG. 7 and the following FIGS. 8, 10, and 12, rectangles of hatching indicate the luminance of pixels, and the lighter the hatching is, the higher the luminance is. Thus, the luminance difference between the pixels across the boundary line BD12 is small, and the boundary line is hardly noticeable. In the first divided region DR1, the luminance of the pixels adjacent to the boundary line BD12 is substantially the same regardless of the position in the y-axis direction.

FIG. 8 is diagrams illustrating the influence of the parasitic resistance and the parasitic capacitance on the pixels adjacent to the boundary line BD23 between the second divided region DR2 and the third divided region DR3. In the second divided region DR2 and the third divided region DR3, the influence of the parasitic resistance and the parasitic capacitance on the pixels varies depending on the position in the y-axis direction. That is, the influence of the parasitic resistance and the parasitic capacitance increases as the pixel is located at a lower position, that is, as the pixel is located on the negative side along the y-axis direction.

Specifically, as illustrated in (a) and (d), the pixel in each divided region connected to the scanning line GL in the upper portion in the y-axis direction is affected by the parasitic resistance and the parasitic capacitance corresponding to two of Rg/Cg or Rb/Cb. As illustrated in (b) and (e), the pixel in each divided region connected to the scanning line GL in the central portion in the y-axis direction is affected by the parasitic resistance and parasitic capacitance corresponding to four of Rg/Cg or Rb/Cb. As illustrated in (c) and (f), the pixel in each divided region connected to the scanning line GL in the lower portion in the y-axis direction is affected by the parasitic resistance and the parasitic capacitance corresponding to six of Rg/Cg or Rb/Cb.

Thus, in each of the second divided region DR2 and the third divided region DR3, as the pixel adjacent to the boundary line BD23 is located in the lower direction, the rounding of the waveform of the applied scanning signal becomes larger and the luminance of the pixel becomes lower. However, when the positions in the y-axis direction are the same, the influence of the parasitic resistance and the parasitic capacitance on the pixels closest to the boundary line BD12 is substantially the same between the second divided region DR2 and the third divided region DR3. Thus, the luminance difference between the pixels across the boundary line BD23 is small, and the boundary line is hardly noticeable.

FIG. 9 illustrates an example in which the distances L1a, L1b, L2a, and L2b do not satisfy Expression (1). As illustrated in FIG. 9, with respect to the boundary line BD12, for example, it is assumed that the relationship of L1a>L1b is satisfied in the first divided region DR1 and the relationship of L2a<L2b is satisfied in the second divided region DR2. That is, an arrangement pattern of AB is satisfied. In this case, as illustrated in (a) and (d) of FIG. 10, in the upper portion in the y-axis direction, the pixel of the first divided region DR1 adjacent to the boundary line BD12 is more affected by the parasitic resistance and the parasitic capacitance than the pixel of the second divided region DR2 adjacent to the boundary line BD12, and the luminance decreases. Thus, the boundary line BD12 due to the luminance difference is noticeable.

As illustrated in (c) and (f) of FIG. 10, in the lower portion in the y-axis direction, the pixel of the second divided region DR2 adjacent to the boundary line BD12 is more affected by the parasitic resistance and the parasitic capacitance than the pixel of the first divided region DR1 adjacent to the boundary line BD12, and the luminance decreases. Thus, the boundary line BD12 due to the luminance difference is noticeable.

As illustrated in FIG. 11, with respect to the boundary line BD12, for example, it is assumed that the relationship of L1a<L1b is satisfied in the first divided region DR1 and the relationship of L2a>L2b is satisfied in the second divided region DR2. That is, an arrangement pattern of BA is satisfied. In this case, as illustrated in (a) and (d) of FIG. 12, in the upper portion in the y-axis direction, the pixel of the second divided region DR2 adjacent to the boundary line BD12 is more affected by the parasitic resistance and the parasitic capacitance than the pixel of the first divided region DR1 adjacent to the boundary line BD12, and the luminance decreases. Thus, the boundary line BD12 due to the luminance difference is noticeable.

As illustrated in (c) and (f) of FIG. 12, in the lower portion in the y-axis direction, the pixel of the first divided region DR1 adjacent to the boundary line BD12 is more affected by the parasitic resistance and the parasitic capacitance than the pixel of the second divided region DR2 adjacent to the boundary line BD12, and the luminance decreases. Thus, the boundary line BD12 due to the luminance difference is noticeable.

As described above, according to the display device 101, when the position of the connection point between the scanning line GL and the scanning line connection wiring line BL satisfies the relationship of Expression (1), the influence of the decrease in luminance of the pixel due to the influence of the parasitic resistance and the parasitic capacitance in the vicinity of the boundary between the two divided regions adjacent to each other is suppressed, and display can be performed in which the difference in luminance (luminance separation) hardly occurs at the boundary between the two divided regions.

In the present embodiment, although three divided regions are disposed along the x-axis direction, even when four or more divided regions are disposed, an image can be displayed in which a difference in luminance hardly occurs at any boundary line by repeating the arrangement pattern of the connection points in the two divided regions across the boundary line as AA, BB, AA, BB, . . . . Further, in the present embodiment, the arrangement pattern of the connection points in the first divided region and the second divided region is AA, but may be BB. In this case, the arrangement pattern of the connection points in the second divided region and the third divided region is AA.

Note that in the case where the arrangement of the connection points in two divided regions adjacent to each other satisfies Expression (1), a direction in which the scanning line drive circuit 60 scans the scanning line connection wiring lines BL is preferably such that a scanning direction of the scanning line drive circuit disposed in a region of one of the pair of divided regions adjacent to each other across the boundary line and a scanning direction of the scanning line drive circuit disposed in a region of the other are different from each other. By determining the scanning directions in this manner, the scanning directions of the scanning lines in the two divided regions adjacent to each other become equal to each other. Specifically, when the scanning lines in the region of one of the pair of divided regions adjacent to each other are scanned from top to bottom, the scanning lines in the region of the other are also scanned from top to bottom. When the scanning lines in the region of one of the pair of divided regions adjacent to each other are scanned from top to bottom, the scanning lines in the region of the other are also scanned from top to bottom.

When the relationships of L1a>L1b and L2a>L2b are satisfied, and each of the scanning line drive circuits of the pair of divided regions adjacent to each other scans a respective one of the scanning line connection wiring lines in a direction toward the boundary line, the scanning lines GL of the pair of divided regions are respectively scanned from top to bottom. When the relationships of L1a<L1b and L2a<L2b are satisfied, and each of the scanning line drive circuits of the pair of divided regions adjacent to each other scans a respective one of the scanning line connection wiring lines in a direction away from the boundary line, the scanning lines GL of the pair of divided regions are respectively scanned from top to bottom.

Next, a detailed configuration of the pixel of the display device 101 is described. FIG. 13A is an enlarged plan view illustrating a part of the active matrix substrate 40 of the display device 101. As illustrated in FIG. 13A, each of the plurality of pixels PX is any one of a red pixel (indicated by R), a green pixel (indicated by G), and a blue pixel (indicated by B) in the present embodiment. Pixels of the same color are disposed in the y-axis direction, and the red pixel, the green pixel, and the blue pixel are repeatedly disposed in this order in the x-axis direction. The arrangement of the plurality of pixels is not limited to this example, and yellow pixels and white pixels may be further included. The arrangement of the pixels may be in accordance with a Bayer array.

Further, a configuration as illustrated in FIG. 13B may be used, in which pixels of the same color are disposed in the x-axis direction, and the red pixel, the green pixel, and the blue pixel are repeatedly disposed in this order in the y-axis direction. In this configuration, although it is necessary to separate the scanning line for the red pixels, the green pixels, and the blue pixels and perform scanning three times faster than the configuration illustrated in FIG. 13A, since the red pixels, the green pixels, and the blue pixels share the data line, the number of expensive data line drive circuits can be reduced to one third.

Since the pixels of the same color are arrayed in the x-axis direction, when the liquid crystal display device has a structure in which a color filter is disposed on the counter substrate, a color shift due to a positional shift between the active matrix substrate and the counter substrate in the x-axis direction can be suppressed. For example, when such a display device is curved along the x-axis direction, a curvature radius of the active matrix substrate is different from that of the counter substrate, and thus positions of the pixels on the active matrix substrate and positions of the pixels on the counter substrate are shifted in the x-axis direction. However, since the pixels of the same color are disposed in the x-axis direction, display in different colors is suppressed even when the positions are shifted.

In the active matrix substrate 40, when a distance between a pair of pixels of the same color that are respectively included in a respective one of the pair of divided regions adjacent to each other and are closest to each other in the x-axis direction is denoted by d1, and a distance between a pair of pixels of the same color that are respectively included in one of the pair of divided regions adjacent to each other and are closest to each other in the x-axis direction is denoted by d2, d1 and d2 are preferably equal. For example, as illustrated in FIGS. 13A and 13B, when a distance between a green pixel closest to the boundary line BD12 in the first divided region DR1 and a green pixel closest to the boundary line BD12 in the second divided region DR2 is denoted by d1, and a distance between the two green pixels closest to each other in the x-axis direction of the first divided region DR1 is denoted by d2, d1=d2 is satisfied. When a distance between the two green pixels closest to each other in the x-axis direction of the second divided region DR2 is denoted by d2', d1=d2=d2' is more preferable.

By satisfying this relationship, the first divided region DR1 and the second divided region DR2 are continuous in the x-axis direction without disposing an extra space between two pixels across the boundary line BD12. Thus, when a continuous image is integrally displayed in the first divided region DR1 and the second divided region DR2, a break of the divided regions does not occur, and excellent display can be performed.

Each of the scanning lines disposed in one of the pair of divided regions adjacent to each other preferably overlap one of the plurality of scanning lines disposed in the other of the pair of divided regions in the y-axis direction when viewed from the x-axis direction. For example, as illustrated in FIG. 14, the scanning line GL in the first divided region DR1 overlaps the scanning line GL in the second divided region DR2 in the y-axis direction in a region indicated by oblique lines. In other words, a shift amount Pe in the y-axis direction between the scanning line GL in the first divided region DR1 and the scanning line GL in the second divided region DR2 is preferably smaller than a width Wg of the scanning line GL (Pe<Wg). More preferably, Pe<½Wg is satisfied. The scanning lines GL disposed in the second divided region DR2 and the third divided region DR3 also preferably satisfy the same relationship.

By disposing the scanning lines GL in this manner, the pixel of the first divided region DR1 and the pixel of the second divided region DR2 are prevented from being shifted in the y-axis direction at the boundary line BD12. Thus, when the continuous image is integrally displayed in the first divided region DR1 and the second divided region DR2, the break of the divided regions does not occur, and excellent display can be performed. Similarly, the pixel of the second divided region DR2 and the pixel of the third divided region DR3 are prevented from being shifted in the y-axis direction at the boundary line BD23. Thus, when the continuous image is integrally displayed in the first divided region DR1, the second divided region DR2, and the third divided region DR3, the break of the divided regions does not occur, and further excellent display can be performed.

In each divided region, the plurality of scanning line connection wiring lines BL are arrayed in the x-axis direction at an arraying pitch of pixels of the same color of the plurality of pixels PX in the x-axis direction. For example, as illustrated in FIG. 13A, in the first divided region DR1, since the arraying pitch of the green pixels in the x-axis direction is d2, an arraying pitch p1 of the scanning line connection wiring lines BL is equal to d2. Similarly, in the second divided region DR2, an arraying pitch p2 of the scanning line connection wiring lines BL is equal to d2'.

Each of the scanning line connection wiring lines BL preferably overlaps one or both of the blue pixel and the red pixel of the red pixel, the green pixel, and the blue pixel adjacent to each other in the x-axis direction. In the example illustrated in FIG. 13A, the scanning line connection wiring line overlaps the blue pixel and is disposed in the blue pixel. As described above, by disposing the scanning line connection wiring line BL, the aperture ratio of the pixel in which the scanning line connection wiring line BL is disposed decreases. Of red, blue, and green, the visibility of green is higher than those of red and blue for human eyes. Thus, when the scanning line connection wiring line BL is disposed in the green pixel to decrease the aperture ratio, the decrease in luminance is strongly perceived. Thus, by disposing the scanning line connection wiring line BL in the red pixel or the blue pixel in which the influence on the luminance due to the decrease in the aperture ratio is relatively small, the influence on the luminance due to the decrease in the aperture ratio can be further suppressed.

FIG. 15 illustrates an example of a cross-sectional structure of the liquid crystal display device taken along line A-A in FIG. 13A. In the active matrix substrate 40, a first insulating layer 11 is disposed on the substrate 10, and the data lines SL and the scanning line connection wiring lines BL are disposed on the first insulating layer 11. The data line SL and the scanning line connection wiring line BL extend in the y-axis direction and do not intersect each other. Thus, they can be made of a metal layer of the same layer. For example, by forming the metal layer so as to cover the first insulating layer 11 and performing patterning, the data line SL and the scanning line connection wiring line BL can be formed at the same time.

A second insulating layer 12 is disposed on the first insulating layer 11 so as to cover the data lines SL and the scanning line connection wiring lines BL, and an interlayer insulating layer 13 for leveling the unevenness of the second insulating layer 12 is disposed on the second insulating layer 12. The pixel electrodes PE are disposed on the interlayer insulating layer 13, and a third insulating layer 14 is disposed so as to cover the pixel electrodes PE. A common electrode 15 is disposed on the third insulating layer 14.

The counter substrate 80 is disposed corresponding to the active matrix substrate 40 with a predetermined distance therebetween, and the liquid crystal layer 81 is disposed between the counter substrate 80 and the active matrix substrate 40.

As described above, since the scanning line connection wiring line BL can be formed by the metal layer of the same layer as the data line SL, the scanning line connection wiring line can be formed without increasing the number of manufacturing steps.

As described above, the scanning line connection wiring lines BL are preferably arrayed in the x-axis direction at the same pitch as the arraying pitch of the pixels of the same color in the x-axis direction. According to this arrangement, when the number of pixels adjacent to each other in the x-axis direction with red, blue, and green pixels as one set is larger than the number of pixels in the y-axis direction, a pixel is generated in which the scanning line connection wiring line BL is not disposed. In this case, the aperture ratio of the pixel in which the scanning line connection wiring line BL is not disposed becomes high, and the aperture ratios of the pixels in each divided region are not uniform.

In such a case, the active matrix substrate 40 may further include at least one dummy scanning line connection wiring line extending in the y-axis direction and arrayed in the x-axis direction. FIG. 16 is a schematic enlarged plan view of an active matrix substrate 40' further including dummy scanning line connection wiring lines DL. The scanning line connection wiring lines BL and the dummy scanning line connection wiring lines DL are disposed at the arraying pitch p1 of the scanning line connection wiring lines BL described above in the x-axis direction. That is, when the scanning line connection wiring line BL is disposed in the blue pixel, the dummy scanning line connection wiring line DL is also disposed in the blue pixel.

As a result, either the scanning line GL or the dummy scanning line connection wiring line DL is disposed in the blue pixel. Thus, the aperture ratio of the blue pixel can be prevented from varying from place to place.

Since the dummy scanning line connection wiring line DL is not involved in the driving of the scanning line GL, the dummy scanning line connection wiring line DL is connected to neither the scanning line drive circuit 60 nor the scanning line GL. However, in a case where the dummy scanning line connection wiring line DL is a floating electrode not connected to any potential, problems may occur such that static electricity is accumulated and a potential difference due to a difference in the amount of charges accumulated between the dummy scanning line connection wiring lines DL is generated. Thus, the active matrix substrate 40 preferably further includes at least one common wiring line CL extending in the x-axis direction, and each dummy scanning line connection wiring line DL is preferably connected to the at least one common wiring line CL. The common wiring line CL is connected to an electrode to which a predetermined potential such as a reference potential is applied. The plurality of dummy scanning line connection wiring lines DL may be connected to the same common wiring line CL.

The common wiring line CL intersects, for example, the scanning line connection wiring line BL. The common wiring line CL intersects the data line.

As described above, by disposing the dummy scanning line connection wiring line DL in the pixel in which the scanning line connection wiring line BL is not disposed, the aperture ratio of the pixel can be made constant.

When the number of pixels adjacent to each other in the x-axis direction with red, blue, and green pixels as one set is twice or more the number of pixels in the y-axis direction, a configuration may be adopted in which as illustrated in FIG. 4A, the scanning line connection wiring lines have redundancy and two scanning line connection wiring lines BL adjacent to each other are connected to the same scanning line GL, and the dummy scanning line DL may be further provided if necessary.

In the display device 101 of the disclosure, various modifications are possible. First, in the above-described embodiment, the display device is the liquid crystal display device, but may be a display device having another structure such as the organic EL display device as described above. The display device of the disclosure can be suitably used in display devices having various structures in which a pixel connected to a scanning line selected by selectively applying a scanning signal to the scanning line is turned on, and each pixel lights up with luminance according to the data signal supplied from the data line.

In the present embodiment, the scanning line drive circuit 60 and the data line drive circuit 70 face each other across each divided region. However, the scanning line drive circuit 60 may be disposed on the same side as the data line drive circuit 70 with respect to each divided region.

For example, as illustrated in FIG. 17, the scanning line drive circuits may be disposed on the same flexible substrate 51 as the data line drive circuits. In this case, for example, when the data lines of the plurality of data lines for driving the red pixel, the green pixel, and the blue pixel are SLr, SLg, and SLb, respectively, each of the scanning line connection wiring lines BL may be disposed adjacent to the data line SLr for driving the red pixel. For example, wiring lines connected to the data lines SLr, SLg, and SLb may be disposed on the front surface side of the flexible substrate 51, and a wiring line connected to the scanning line connection wiring line BL may be disposed on the rear surface side of the flexible substrate 51.

Further, as illustrated in FIG. 18, a drive circuit 65 in which the scanning line drive circuit and the data line drive circuit are accommodated in one package may be formed and disposed on the flexible substrate 51. That is, the drive circuit 65 may serve as both the scanning line drive circuit and the data line drive circuit. In the drive circuit 65, for example, as in FIG. 17, the data lines SL and the scanning line connection wiring line BL may be disposed in the order of the data lines SLr, SLg, and SLb and the scanning line connection wiring line BL in the x-axis direction, and may be connected to the drive circuit 65.

The shape and size of the display region DR and the number of divided regions included in the display region DR are merely examples, and the shape, size, and the number are not limited to those in the above-described embodiments.

The display device of the disclosure can be explained as follows. The display device according to a first configuration of the disclosure includes a substrate including a main surface including a display region and a non-display region located around the display region, in which the display region includes a substrate including three or more divided regions disposed adjacent to each other along a first direction, a plurality of scanning lines disposed in each divided region, extending in the first direction, and arrayed in a second direction intersecting the first direction, a plurality of data lines disposed in each divided region, extending in the second direction, and arrayed in the first direction, a plurality of pixels disposed in each divided region, each of the plurality of pixels being disposed in a region surrounded by a pair of the data lines of the plurality of data lines and a pair of the scanning lines of the plurality of scanning lines, a plurality of scanning line connection wiring lines disposed in each divided region, extending in the second direction, and arrayed in the first direction, a plurality of data line drive circuits connected to the plurality of data lines, respectively, in each divided region, and a plurality of scanning line drive circuits corresponding to each divided region, the plurality of scanning line drive circuits and the plurality of data line drive circuits are respectively arrayed in the first direction outside the display region, each of the scanning line connection wiring lines electrically connects the scanning line drive circuit to one of the plurality of scanning lines, and the scanning line drive circuit and the data line drive circuit display an image in at least one of the three or more divided regions at a frame frequency different from a frame frequency of the other divided regions.

According to the first configuration, since some of the display region can be driven at a different frame frequency, power consumption can be reduced. Since the scanning line drive circuits and the data line drive circuits are arrayed in the first direction, the divided regions adjacent to each other can be disposed in contact with each other, and the break of the images displayed in the divided regions can be made not noticeable.

In the display device according to a second configuration, in the first configuration, the scanning line drive circuit and the data line drive circuit in each divided region may face each other across each divided region.

In the display device according to a third configuration, in the first or second configuration, the plurality of scanning lines in each divided region need not be connected to the plurality of scanning lines in an adjacent divided region.

In the display device according to a fourth configuration, in any one of the first to third configurations, each of the scanning line connection wiring lines is electrically connected to one of the plurality of scanning lines at a connection point, and when a distance between one connection point of a plurality of connection points in one of a pair of divided regions adjacent to each other across a boundary line of the three or more divided regions and the boundary line is denoted by L1a, and a distance between another connection point located farther from an upper end of the display region than the one connection point and the boundary line is denoted by L1b, and a distance between one connection point of the plurality of connection points in the other of the pair of divided regions and the boundary line is denoted by L2a, and a distance between the other connection point located farther from the upper end of the display region than the one connection point and the boundary line is denoted by L2b, a relationship of (L1b-L1a)×(L2b-L2a)>0 may be satisfied. By satisfying this relationship, display can be performed in which luminance separation at a boundary portion does not occur.

In the display device according to a fifth configuration, in any one of the first to fourth configurations, the plurality of scanning line connection wiring lines and the plurality of data lines may be made of a metal layer of the same layer. According to this configuration, the scanning line connection wiring lines can be formed without increasing the number of manufacturing steps.

In the display device according to a sixth configuration, in any one of the first to fifth configurations, a scanning direction of the scanning line drive circuit disposed in a region of one of the pair of divided regions adjacent to each other across the boundary line of the three or more divided regions and a scanning direction of the scanning line drive circuit disposed in a region of the other of the pair of divided regions may be different from each other. Accordingly, scanning can be performed in which luminance separation at the boundary portion does not occur.

In the display device according to a seventh configuration, in any one of the first to sixth configurations, each of the scanning line connection wiring lines may extend in the second direction beyond the connection point.

In the display device according to an eighth configuration, in the seventh configuration, each of 70% or more of the scanning line connection wiring lines of the plurality of scanning line connection wiring lines may have a length of 70% or more of the width of the display region in the second direction.

In the display device according to a ninth configuration, in any one of the first to eighth configurations, each of the plurality of pixels may be one of a red pixel, a green pixel, and a blue pixel, and pixels of the same color may be disposed in the second direction.

In the display device according to a tenth configuration, in any one of the first to ninth configurations, the plurality of scanning line connection wiring lines may be arrayed in the first direction at an arraying pitch of pixels of the same color of the plurality of pixels in the first direction.

In the display device according to an eleventh configuration, in any one of the first to tenth configurations, one or both of a blue pixel and a red pixel of the red pixel, the green pixel, and the blue pixel adjacent to each other in the first direction may overlap one of the plurality of scanning line connection wiring lines.

The display device according to a twelfth configuration in any one of the first to eleventh configurations further includes at least one dummy scanning line connection wiring line disposed in the display region, extending in the second direction, and arrayed in the first direction, in which the at least one dummy scanning line connection wiring line need not be connected to the scanning line drive circuit and the plurality of scanning lines. By disposing the dummy scanning line connection wiring line, the aperture ratios of the pixels can be made uniform.

The display device according to a thirteenth configuration in any one of the first to twelfth configurations further includes at least one common wiring line extending in the first direction and a plurality of dummy scanning line connection wiring lines, in which the plurality of dummy scanning line connection wiring lines may be connected to the at least one common wiring line.

In the display device according to a fourteenth configuration, in the thirteenth configuration, the at least one common wiring line may intersect the plurality of scanning line connection wiring lines.

In the display device according to a fifteenth configuration, in the thirteenth or fourteenth configuration, the at least one common wiring line may intersect the plurality of data lines.

In the display device according to a sixteenth configuration, in any one of the first to fifteenth configurations, each of the scanning lines disposed in one of the pair of divided regions adjacent to each other of the three or more divided regions may overlap one of the plurality of scanning lines disposed in the other of the pair of divided regions in the second direction when viewed from the first direction.

In the display device according to a seventeenth configuration, in any one of the first to sixteenth configurations, the number of the plurality of scanning lines disposed in one of the pair of divided regions adjacent to each other of the three or more divided regions may be equal to the number of the plurality of scanning lines disposed in the other of the pair of divided regions.

In the display device according to an eighteenth configuration, in any one of the first to seventeenth configurations, when a distance between a pair of pixels of the same color that are respectively included in a respective one of the pair of divided regions adjacent to each other of the three or more divided regions and are closest to each other in the first direction is denoted by d1, and a distance between a pair of pixels of the same color that are respectively included in one of the pair of divided regions adjacent to each other and are closest to each other in the first direction is denoted by d2, d1 and d2 may be equal. Since the pitch of the pixels across a boundary is equal to the pitch of the pixels in the divided region, the pitches of the pixels in the entire divided regions are equal and the boundary does not occur. That is, one continuous image can be displayed in the entire divided regions.

In the display device according to a nineteenth configuration, in any one of the first to eighteenth configurations, in each divided region, a maximum width in the first direction may be larger than a maximum height in the second direction.

In the display device according to a twentieth configuration, in any one of the first to nineteenth configurations, shapes of two divided regions adjacent to each other of the three or more divided regions may be different from each other.

In the display device according to a twenty first configuration, in any one of the first to twentieth configurations, each of the plurality of pixels may include a TFT connected to one of the plurality of scanning lines and one of the plurality of data lines, and a pixel electrode connected to the TFT, and the display device may further include a counter substrate, a liquid crystal layer located between the substrate and the counter substrate, a pair of polarizers located so as to sandwich the counter substrate and the substrate, and a backlight disposed so as to face the pair of polarizers.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device comprising:
a substrate including a main surface including a display region and a non-display region located around the display region,
wherein the display region includes
a substrate including three or more divided regions disposed adjacent to each other along a first direction,
a plurality of scanning lines disposed in each divided region, extending in the first direction, and arrayed in a second direction intersecting the first direction,
a plurality of data lines disposed in each divided region, extending in the second direction, and arrayed in the first direction,
a plurality of pixels disposed in each divided region, each of the plurality of pixels being disposed in a region surrounded by a pair of the data lines of the plurality of data lines and a pair of the scanning lines of the plurality of scanning lines,
a plurality of scanning line connection wiring lines disposed in each divided region, extending in the second direction, and arrayed in the first direction,
a plurality of data line drive circuits connected to the plurality of data lines, respectively, in each divided region, and
a plurality of scanning line drive circuits corresponding to each divided region,
the plurality of scanning line drive circuits and the plurality of data line drive circuits are respectively arrayed in the first direction outside the display region,
each of the scanning line connection wiring lines electrically connects the scanning line drive circuit to one of the plurality of scanning lines, and
the scanning line drive circuit and the data line drive circuit display an image in at least one of the three or more divided regions at a frame frequency different from a frame frequency of the other divided regions.

2. The display device according to claim 1,
wherein the scanning line drive circuit and the data line drive circuit in each divided region face each other across each divided region.

3. The display device according to claim 1,
wherein the plurality of scanning lines in each divided region are not connected to the plurality of scanning lines in an adjacent divided region.

4. The display device according to claim 1,
wherein each of the scanning line connection wiring lines is electrically connected to one of the plurality of scanning lines at a connection point, and
when a distance between one connection point of a plurality of connection points in one of a pair of divided regions adjacent to each other across a boundary line of the three or more divided regions and the boundary line is denoted by L1a, and a distance between another connection point located farther from an upper end of the display region than the one connection point and the boundary line is denoted by L1b, and
a distance between one connection point of the plurality of connection points in the other of the pair of divided regions and the boundary line is denoted by L2a, and a distance between the other connection point located farther from the upper end of the display region than the one connection point and the boundary line is denoted by L2b,
a relationship of $(L1b-L1a) \times (L2b-L2a) > 0$ is satisfied.

5. The display device according to claim 1,
wherein the plurality of scanning line connection wiring lines and the plurality of data lines are made of a metal layer of the same layer.

6. The display device according to claim 1,
wherein a scanning direction of the scanning line drive circuit disposed in a region of one of the pair of divided regions adjacent to each other across the boundary line of the three or more divided regions and a scanning direction of the scanning line drive circuit disposed in a region of the other of the pair of divided regions are different from each other.

7. The display device according to claim 1,
wherein each of the scanning line connection wiring lines extends in the second direction beyond the connection point.

8. The display device according to claim 7,
wherein each of 70% or more of the scanning line connection wiring lines of the plurality of scanning line connection wiring lines has a length of 70% or more of the width of the display region in the second direction.

9. The display device according to claim 1,
wherein each of the plurality of pixels is any one of a red pixel, a green pixel, and a blue pixel, and pixels of the same color are disposed in the first direction or the second direction in each divided region, and
the pixels of the same color are disposed in the same direction in the pair of divided regions adjacent to each other of the three or more divided regions.

10. The display device according to claim 9,
wherein the plurality of scanning line connection wiring lines are arrayed in the first direction at an arraying pitch of pixels of the same color of the plurality of pixels in the first direction.

11. The display device according to claim 9,
wherein one or both of a blue pixel and a red pixel of the red pixel, the green pixel, and the blue pixel adjacent to each other in the first direction overlaps one of the plurality of scanning line connection wiring lines.

12. The display device according to claim 9,
wherein, when a distance between a pair of pixels of the same color that are respectively included in a respective one of the pair of divided regions adjacent to each other of the three or more divided regions and are closest to each other in the first direction is denoted by d1, and a distance between a pair of pixels of the same color that are respectively included in one of the pair of divided regions adjacent to each other and are closest to each other in the first direction is denoted by d2, d1 and d2 are equal.

13. The display device according to claim 1, further comprising:
at least one dummy scanning line connection wiring line disposed in the display region, extending in the second direction, and arrayed in the first direction,
wherein the at least one dummy scanning line connection wiring line is not connected to the scanning line drive circuit and the plurality of scanning lines.

14. The display device according to claim 13, further comprising:

at least one common wiring line extending in the first direction; and a plurality of dummy scanning line connection wiring lines, wherein the plurality of dummy scanning line connection wiring lines are connected to the at least one common wiring line.

15. The display device according to claim 14, wherein the at least one common wiring line intersects the plurality of scanning line connection wiring lines.

16. The display device according to claim 14, wherein the at least one common wiring line intersects the plurality of data lines.

17. The display device according to claim 1, wherein each of the scanning lines disposed in one of the pair of divided regions adjacent to each other of the three or more divided regions overlaps one of the plurality of scanning lines disposed in the other of the pair of divided regions in the second direction when viewed from the first direction.

18. The display device according to claim 1, wherein the number of the plurality of scanning lines disposed in one of the pair of divided regions adjacent to each other of the three or more divided regions is equal to the number of the plurality of scanning lines disposed in the other of the pair of divided regions.

19. The display device according to claim 1, wherein in each divided region, a maximum width in the first direction is larger than a maximum height in the second direction.

20. The display device according to claim 1, wherein shapes of two divided regions adjacent to each other of the three or more divided regions are different from each other.

21. The display device according to claim 1, wherein each of the plurality of pixels includes a TFT connected to one of the plurality of scanning lines and one of the plurality of data lines, and a pixel electrode connected to the TFT, and the display device further includes a counter substrate, a liquid crystal layer located between the substrate and the counter substrate, a pair of polarizers located so as to sandwich the counter substrate and the substrate, and a backlight disposed so as to face the pair of polarizers.

* * * * *